United States Patent
Bickerstaff et al.

(10) Patent No.: US 9,881,421 B2
(45) Date of Patent: Jan. 30, 2018

(54) IMAGE PROCESSING

(71) Applicant: Sony Interactive Entertainment Europe Limited, London (GB)

(72) Inventors: Ian Henry Bickerstaff, London (GB); Sharwin Winesh Raghoebardajal, London (GB)

(73) Assignee: Sony Interactive Entertainment Europe Limited (GB)

( * ) Notice: Subject to any disclaimer, the term of this patent is extended or adjusted under 35 U.S.C. 154(b) by 147 days.

(21) Appl. No.: 14/810,736

(22) Filed: Jul. 28, 2015

(65) Prior Publication Data

US 2016/0035140 A1 Feb. 4, 2016

(30) Foreign Application Priority Data

Jul. 29, 2014 (GB) .................................. 1413400.1

(51) Int. Cl.
*G09G 5/00* (2006.01)
*G06T 19/00* (2011.01)
*A63F 13/26* (2014.01)
*A63F 13/211* (2014.01)
*A63F 13/525* (2014.01)
*G02B 27/01* (2006.01)

(52) U.S. Cl.
CPC .......... *G06T 19/006* (2013.01); *A63F 13/211* (2014.09); *A63F 13/26* (2014.09); *A63F 13/525* (2014.09); *G02B 27/0172* (2013.01); *G02B 27/0179* (2013.01); *G02B 2027/014* (2013.01); *G02B 2027/0138* (2013.01); *G02B 2027/0187* (2013.01)

(58) Field of Classification Search
USPC .................................................. 345/647, 649
See application file for complete search history.

(56) References Cited

U.S. PATENT DOCUMENTS

2003/0184868 A1* 10/2003 Geist .................. G02B 27/0176
359/630
2005/0156817 A1 7/2005 Iba
2008/0297437 A1 12/2008 Takahashi

FOREIGN PATENT DOCUMENTS

GB 2512404 A 10/2014

OTHER PUBLICATIONS

British Search and Examination Report for Application No. GB1413400.1 dated Jan. 29, 2015.

* cited by examiner

*Primary Examiner* — Ryan R Yang
(74) *Attorney, Agent, or Firm* — Lerner, David, Littenberg, Krumholz & Mentlik, LLP

(57) ABSTRACT

An image processing method for a head mounted display device is provided, operable in respect of an image generated for display by the head mountable display device according to at least one of an initial position or orientation of a viewpoint. The method includes detecting one or both of a current position or orientation of the head mountable display device depending upon a display time at which the image is to be displayed. The method further includes processing the image using pixel position mappings in which at least a subset of pixels of the image are displaced by respective pixel displacements dependent upon a difference between at least one of the initial position and the detected current position, or the initial orientation and the detected current orientation at the time at which the image is to be displayed.

16 Claims, 22 Drawing Sheets

LEFT RIGHT

IMAGE PROCESSING

CROSS REFERENCE TO RELATED APPLICATIONS

The present application claims the benefit of the earlier filing date of GB1413400.1 filed in the United Kingdom Intellectual Property Office on 29 Jul. 2014, the entire contents of which applications are incorporated herein by reference.

BACKGROUND

Field

This disclosure relates to image processing, for example for image display.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

As background, an example head-mountable display (HMD) will be discussed, although (as described further below) the disclosure is applicable to other types of displays.

An HMD is an image or video display device which may be worn on the head or as part of a helmet. Either one eye or both eyes are provided with small electronic display devices.

Some HMDs allow a displayed image to be superimposed on a real-world view. This type of HMD can be referred to as an optical see-through HMD and generally requires the display devices to be positioned somewhere other than directly in front of the users eyes. Some way of deflecting the displayed image so that the user may see it is then required. This might be through the use of a partially reflective mirror placed in front of the user's eyes so as to allow the user to see through the mirror but also to see a reflection of the output of the display devices. In another arrangement, disclosed in EP-A-1 731 943 and US-A-2010/0157433, the contents of which are incorporated herein by reference, a waveguide arrangement employing total internal reflection is used to convey a displayed image from a display device disposed to the side of the users head so that the user may see the displayed image but still see a view of the real world through the waveguide. Once again, in either of these types of arrangement, a virtual image of the display is created (using known techniques) so that the user sees the virtual image at an appropriate size and distance to allow relaxed viewing. For example, even though the physical display device may be tiny (for example, 10 mm×10 mm) and may be just a few millimeters from the users eye, the virtual image may be arranged so as to be perceived by the user at a distance of (for example) 20 m from the user, having a perceived size of 5 m×5 m.

Other HMDs, however, allow the user only to see the displayed images, which is to say that they obscure the real world environment surrounding the user. This type of HMD can position the actual display devices in front of the user's eyes, in association with appropriate lenses which place a virtual displayed image at a suitable distance for the user to focus in a relaxed manner—for example, at a similar virtual distance and perceived size as the optical see-through HMD described above. This type of device might be used for viewing movies or similar recorded content, or for viewing so-called virtual reality content representing a virtual space surrounding the user. It is of course however possible to display a real-world view on this type of HMD, for example by using a forward-facing camera to generate images for display on the display devices.

Although the original development of HMDs was perhaps driven by the military and professional applications of these devices, HMDs are becoming more popular for use by casual users in, for example, computer game or domestic computing applications.

SUMMARY

This disclosure is defined by claim 1.

Further respective aspects and features of the disclosure are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 22 is a schematic flowchart relating to the technique shown in FIG. 21;

DESCRIPTION OF THE EMBODIMENTS

Embodiments of the present disclosure can provide a display method and apparatus using a display operable to display an image to a viewer. In some embodiments, the display is a head-mountable display and the position and/or orientation of the viewer's head is detected by detecting a position and/or orientation of the head-mountable display. The head mountable display may have a frame to be mounted onto an viewer's head, the frame defining one or two eye display positions which, in use, are positioned in front of a respective eye of the viewer and a respective display element is mounted with respect to each of the eye display positions, the display element providing a virtual image of a video display of a video signal from a video signal source to that eye of the viewer. In other examples, the display is not a head-mountable display. In some embodiments, the display (whether head mountable or not) may be referred to as an immersive display, in that in normal use it fills at least a threshold angular range (for example, at least 40°) of the field of view of the user. Examples include multiple projector displays, wrap-around (curved) displays and the like.

Figure 1:
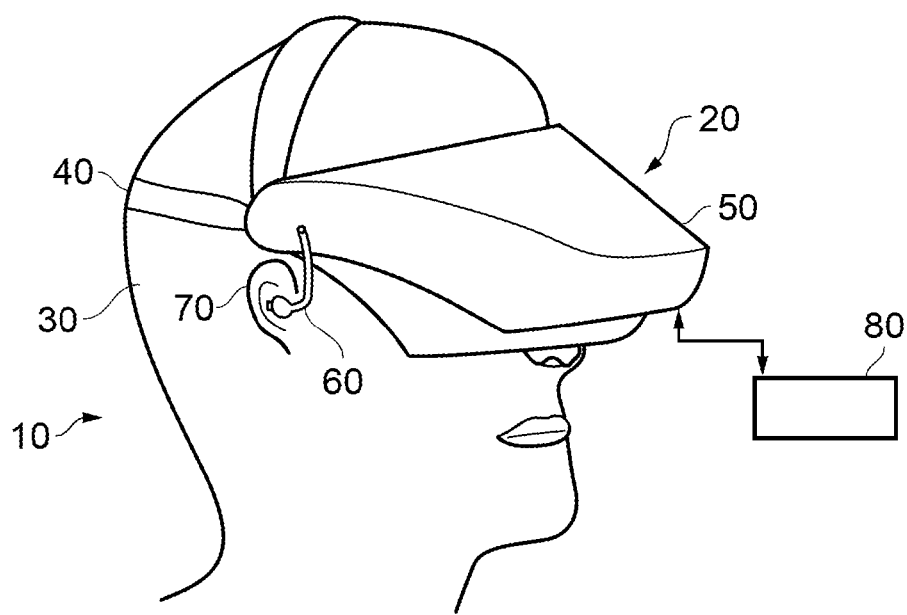
FIG. 1 schematically illustrates an HMD worn by a user.

Referring now to FIG. 1, a user 10 is wearing an HMD 20 on the users head 30. The HMD comprises a frame 40, in this example formed of a rear strap and a top strap, and a display portion 50.

The HMD of FIG. 1 completely obscures the users view of the surrounding environment. All that the user can see is the pair of images displayed within the HMD. The HMD has associated headphone earpieces 60 which fit into the users left and right ears 70. The earpieces 60 replay an audio signal provided from an external source, which may be the same as the video signal source which provides the video signal for display to the users eyes.

In operation, a video signal is provided for display by the HMD. This could be provided by an external video signal source 80 such as a video games machine or data processing apparatus (such as a personal computer), in which case the signals could be transmitted to the HMD by a wired or a wireless connection. Examples of suitable wireless connections include Bluetooth® connections. Audio signals for the earpieces 60 can be carried by the same connection. Similarly, any control signals passed from the HMD to the video (audio) signal source may be carried by the same connection.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other examples, the users view of the external environment may not in fact be entirely obscured; the displayed images could be arranged so as to be superposed (from the users point of view) over the external environment. An example of such an arrangement will be described below with reference to FIG. 4.

In the example of FIG. 1, a separate respective display is provided for each of the user's eyes. A schematic plan view of how this is achieved is provided as FIG. 2, which illustrates the positions 100 of the users eyes and the relative position 110 of the users nose. The display portion 50, in schematic form, comprises an exterior shield 120 to mask ambient light from the users eyes and an internal shield 130 which prevents one eye from seeing the display intended for the other eye. The combination of the users face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
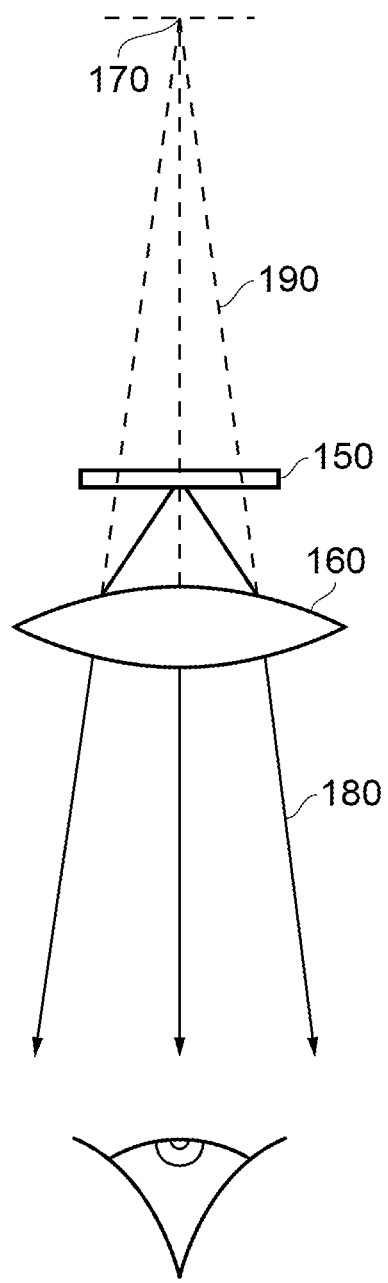
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several meters. In FIG. 3, solid lines (such as the line 180) are used to denote real optical rays, whereas broken lines (such as the line 190) are used to denote virtual rays.

Figure 4:
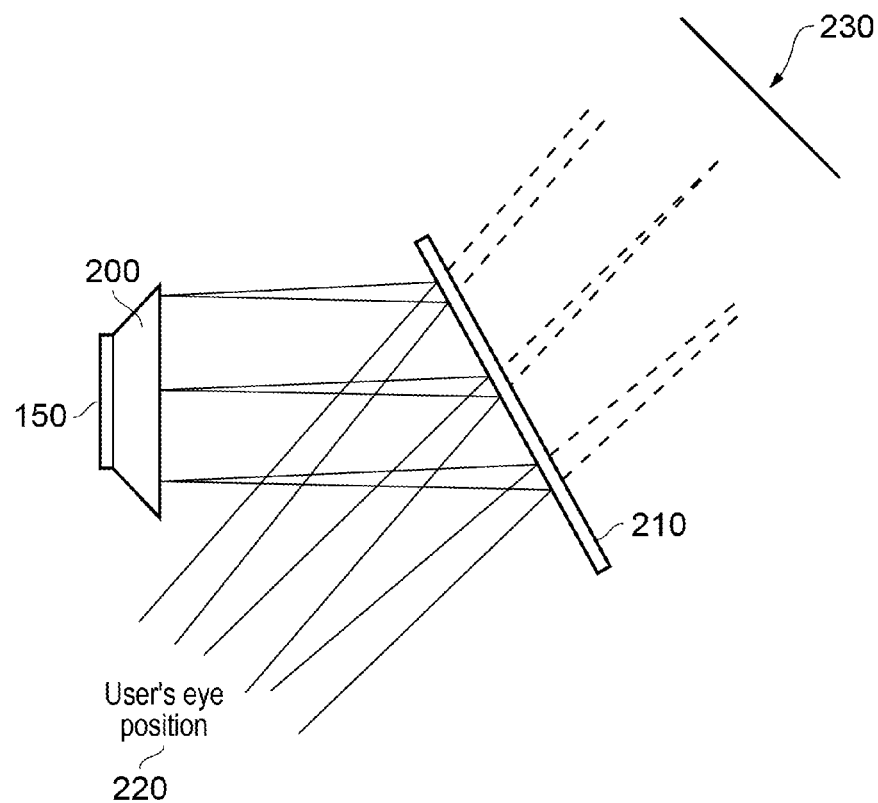
FIG. 4 schematically illustrates another type of display for use in an HMD.

An alternative arrangement is shown in FIG. 4. This arrangement may be used where it is desired that the users view of the external environment is not entirely obscured. However, it is also applicable to HMDs in which the users external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the users view of the external surroundings is entirely obscured, the mirror 210 can be a substantially 100% reflective mirror. The arrangement of FIG. 4 then has the advantage that the display element and optical elements can be located closer to the centre of gravity of the users head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 (and those in FIG. 15 to be described below) could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint need to track movements with respect to a real or virtual space in which the user is located.

This tracking is carried out by detecting motion of the HMD and varying the apparent viewpoint of the displayed images so that the apparent viewpoint tracks the motion.

Figure 6:
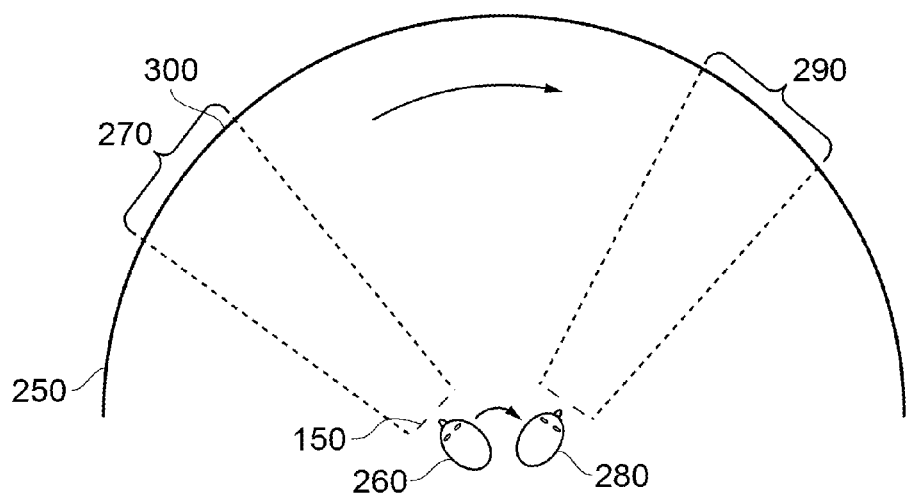
FIG. 6 schematically illustrates a change of view of user of an HMD.

FIG. 6 schematically illustrates the effect of a user head movement in a VR or AR system.

Referring to FIG. 6, a virtual environment is represented by a (virtual) spherical shell 250 around a user. Because of the need to represent this arrangement on a two-dimensional paper drawing, the shell is represented by a part of a circle, at a distance from the user equivalent to the separation of the displayed virtual image from the user. A user is initially at a first position 260 and is directed towards a portion 270 of the virtual environment. It is this portion 270 which is represented in the images displayed on the display elements 150 of the user's HMD.

Consider the situation in which the user then moves his head to a new position and/or orientation 280. In order to maintain the correct sense of the virtual reality or augmented reality display, the displayed portion of the virtual environment also moves so that, at the end of the movement, a new portion 290 is displayed by the HMD.

So, in this arrangement, the apparent viewpoint within the virtual environment moves with the head movement. If the head rotates to the right side, for example, as shown in FIG. 6, the apparent viewpoint also moves to the right from the user's point of view. If the situation is considered from the aspect of a displayed object, such as a displayed object 300, this will effectively move in the opposite direction to the head movement. So, if the head movement is to the right, the apparent viewpoint moves to the right but an object such as the displayed object 300 which is stationary in the virtual environment will move towards the left of the displayed image and eventually will disappear off the left-hand side of the displayed image, for the simple reason that the displayed portion of the virtual environment has moved to the right whereas the displayed object 300 has not moved in the virtual environment. Similar considerations apply to the up-down component of any motion.

Figure 2:
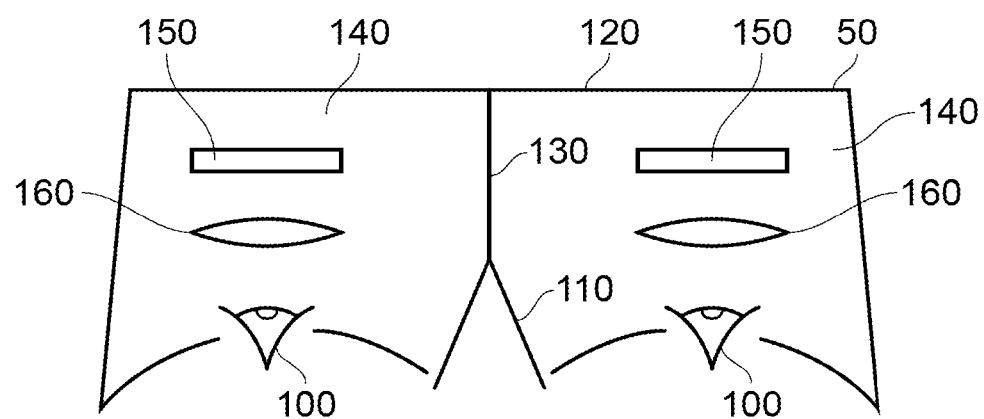
FIG. 2 is a schematic plan view of an HMD.
Figure 7A:
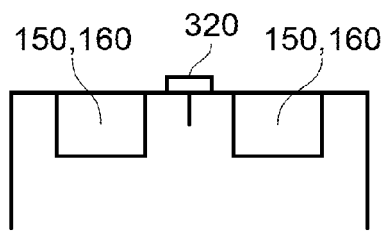
FIGS. 7*a* and 7*b* schematically illustrate HMDs with motion sensing.
Figure 7B:
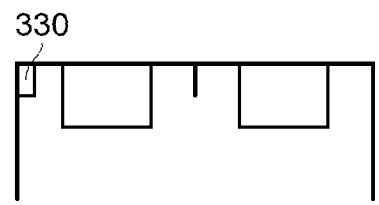

FIGS. 7a and 7b schematically illustrated HMDs with motion sensing. The two drawings are in a similar format to that shown in FIG. 2. That is to say, the drawings are schematic plan views of an HMD, in which the display element 150 and optical elements 160 are represented by a simple box shape. Many features of FIG. 2 are not shown, for clarity of the diagrams. Both drawings show examples of HMDs with a motion detector for detecting motion of the observer's head.

In FIG. 7a, a forward-facing camera 320 is provided on the front of the HMD. This does not necessarily provide images for display to the user (although it could do so in an augmented reality arrangement). Instead, its primary purpose in the present embodiments is to allow motion sensing. A technique for using images captured by the camera 320 for motion sensing will be described below in connection with FIG. 8. In these arrangements, the motion detector comprises a camera mounted so as to move with the frame; and an image comparator operable to compare successive images captured by the camera so as to detect inter-image motion.

FIG. 7b makes use of a hardware motion detector 330. This can be mounted anywhere within or on the HMD. Examples of suitable hardware motion detectors are piezoelectric accelerometers or optical fibre gyroscopes. It will of course be appreciated that both hardware motion detection and camera-based motion detection can be used in the same device, in which case one sensing arrangement could be used as a backup when the other one is unavailable, or one sensing arrangement (such as the camera) could provide data for changing the apparent viewpoint of the displayed images, whereas the other (such as an accelerometer) could provide data for image stabilisation.

Figure 8:
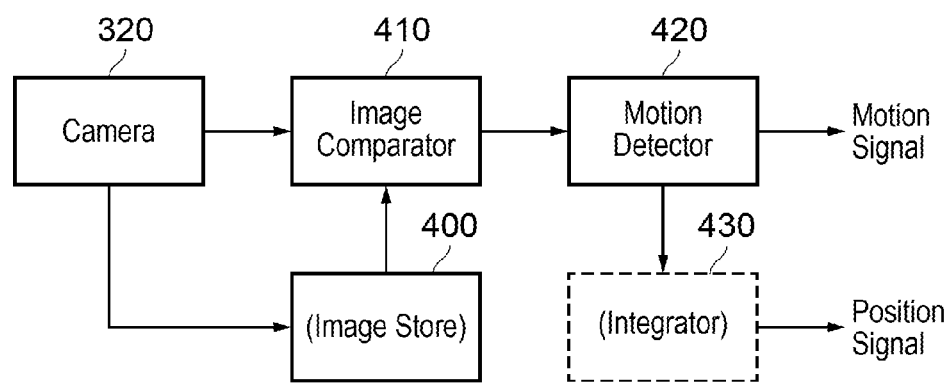
FIG. 8 schematically illustrates a position sensor based on optical flow detection.

FIG. 8 schematically illustrates one example of motion detection using the camera 320 of FIG. 7a.

The camera 320 is a video camera, capturing images at an image capture rate of, for example, 25 images per second. As each image is captured, it is passed to an image store 400 for storage and is also compared, by an image comparator 410, with a preceding image retrieved from the image store. The comparison uses known block matching techniques (so-called "optical flow" detection) to establish whether substantially the whole image captured by the camera 320 has moved since the time at which the preceding image was captured. Localised motion might indicate moving objects within the field of view of the camera 320, but global motion of substantially the whole image would tend to indicate motion of the camera rather than of individual features in the captured scene, and in the present case because the camera is mounted on the HMD, motion of the camera corresponds to motion of the HMD and in turn to motion of the user's head.

The displacement between one image and the next, as detected by the image comparator 410, is converted to a signal indicative of motion by a motion detector 420. If required, the motion signal is converted by to a position signal by an integrator 430.

As mentioned above, as an alternative to, or in addition to, the detection of motion by detecting inter-image motion between images captured by a video camera associated with the HMD, the HMD can detect head motion using a mechanical or solid state detector 330 such as an accelerometer. This can in fact give a faster response in respect of the indication of motion, given that the response time of the video-based system is at best the reciprocal of the image capture rate. In some instances, therefore, the detector 330 can be better suited for use with higher frequency motion detection. However, in other instances, for example if a high image rate camera is used (such as a 200 Hz capture rate camera), a camera-based system may be more appropriate. In terms of FIG. 8, the detector 330 could take the place of the camera 320, the image store 400 and the comparator 410, so as to provide an input directly to the motion detector 420. Or the detector 330 could take the place of the motion detector 420 as well, directly providing an output signal indicative of physical motion.

Other position or motion detecting techniques are of course possible. For example, a mechanical arrangement by which the HMD is linked by a moveable pantograph arm to a fixed point (for example, on a data processing device or on a piece of furniture) may be used, with position and orientation sensors detecting changes in the deflection of the pantograph arm. In other embodiments, a system of one or more transmitters and receivers, mounted on the HMD and on a fixed point, can be used to allow detection of the position and orientation of the HMD by triangulation techniques. For example, the HMD could carry one or more directional transmitters, and an array of receivers associated with known or fixed points could detect the relative signals from the one or more transmitters. Or the transmitters could be fixed and the receivers could be on the HMD. Examples of transmitters and receivers include infra-red transducers, ultrasonic transducers and radio frequency transducers. The radio frequency transducers could have a dual purpose, in that they could also form part of a radio frequency data link to and/or from the HMD, such as a Bluetooth® link.

Figure 9:
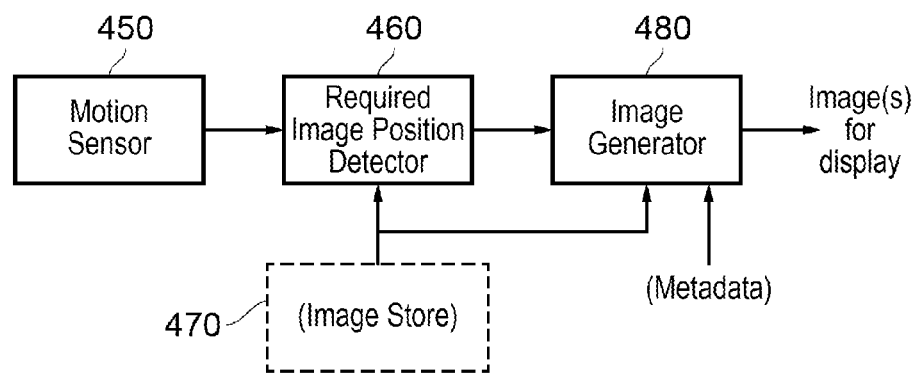
FIG. 9 schematically illustrates the generation of images in response to HMD position or motion detection.

FIG. 9 schematically illustrates image processing carried out in response to a detected position or change in position of the HMD.

As mentioned above in connection with FIG. 6, in some applications such as virtual reality and augmented reality arrangements, the apparent viewpoint of the video being displayed to the user of the HMD is changed in response to a change in actual position or orientation of the user's head.

With reference to FIG. 9, this is achieved by a motion sensor 450 (such as the arrangement of FIG. 8 and/or the motion detector 330 of FIG. 7b) supplying data indicative of motion and/or current position to a required image position detector 460, which translates the actual position of the HMD into data defining the required image for display. An image generator 480 accesses image data stored in an image store 470 if required, and generates the required images from the appropriate viewpoint for display by the HMD. The external video signal source can provide the functionality of the image generator 480 and act as a controller to compensate for the lower frequency component of motion of the observer's head by changing the viewpoint of the displayed image so as to move the displayed image in the opposite direction to that of the detected motion so as to change the apparent viewpoint of the observer in the direction of the detected motion.

The image generator 480 may act on the basis of metadata such as so-called view matrix data, in a manner to be described below.

Figure 10:
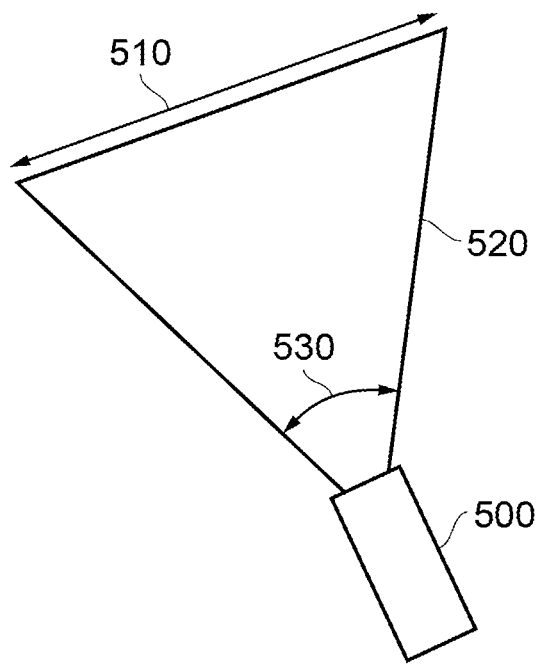
FIG. 10 schematically illustrates the capture of an image by a camera.
Figure 11:
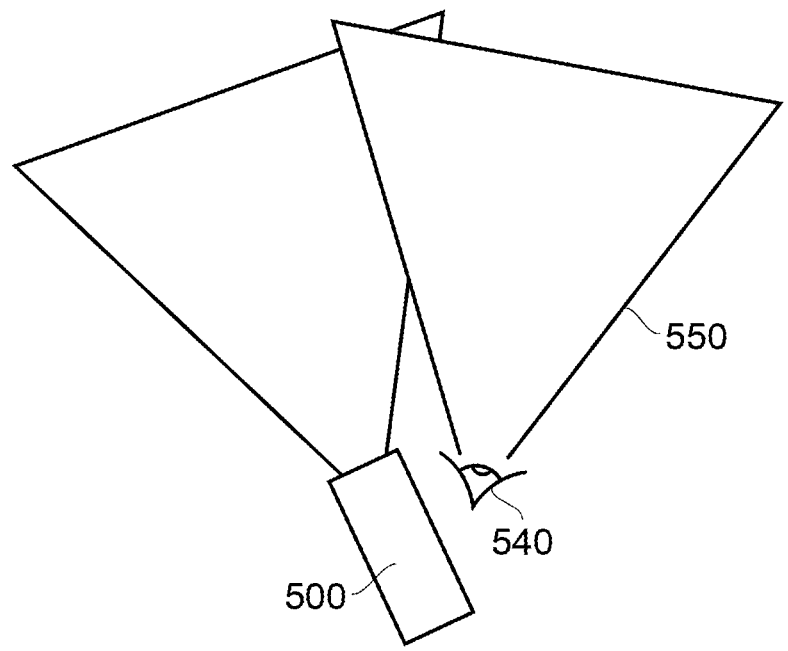
FIG. 11 schematically illustrates the reprojection of the captured image.

In order to illustrate schematically some of the general concepts associated with the present technology, FIG. 10 schematically illustrates the capture of an image by a camera and FIG. 11 schematically illustrates the reprojection of the captured image.

Referring to FIG. 10, a camera 500 captures an image of a portion 510 of a real-world scene. The field of view of the camera 500 is shown schematically as a generally triangular shape 520, such that the camera is at one apex of the generally triangular shape, the sides adjacent to the camera schematically indicate the left and right extremes of the field of view and the side opposite the camera schematically illustrates the portion of the scene which is captured. This schematic notation will be used in several of the following drawings.

To discuss the general concept of image reprojection, assume that in the arrangement of FIG. 10, not only the image is captured but also information defining a "view matrix" of the camera is also captured. Here, the view matrix may refer to the camera's position and/or orientation in space, either relative to a notional fixed point and orientation or expressed as changes with respect to the position and/or orientation applicable at a previous time (which may be the time associated with a preceding captured image, for example). So, in one expression, the view matrix could be considered as the x, y and z spatial position of the camera along with its rotational orientation expressed as yaw, pitch and roll (general terms indicative of three orthogonal rotational degrees of freedom) and its viewing frustum (a general term indicative of the field of view of the camera, ranging between a wide-angle field of view and a narrow angle or telephoto field of view, and which may be expressed as an angular range corresponding to, for example, the angle 530 shown in FIG. 10). The view matrix data need not comprise all of these data contributions. For example, in some arrangements, only a lateral rotational orientation (yaw) may be relevant. The choice of which data items to include within the view matrix data is therefore a matter for the system designer, taking into account the expected uses of the captured images and view matrix data.

In embodiments of the disclosure, the view matrix data is stored in association with the captured image, for example as so-called metadata which is stored and/or transmitted as part of the overall image data package, for example by a camera apparatus such as that described below with reference to FIG. 27 comprising an image capture device for capturing an image; a position and/or orientation detector for detecting the position and/or orientation of the camera apparatus at the time of capture of the image; and a metadata generator for associating metadata with the image, the metadata indicating the detected position and/or orientation of the camera apparatus at the time of capture of the image.

Note that the camera 500 may be a stills camera or a video camera capturing a succession of images, separated by time intervals.

FIG. 11 schematically illustrates the reprojection of the image captured by the camera of FIG. 10 according to a viewpoint of a viewer. The viewpoint 540 is schematically illustrated by an eye symbol and a generally triangular shape 550 which is similar to the triangular shape 520 discussed above. In order to display the image captured by the camera 500 so that it is appropriate for viewing according to the viewpoint shown in FIG. 11, a process is carried out which relates the view matrix (as discussed above) of the viewpoint to the view matrix of the camera 500. Examples of such techniques will be described with reference to FIGS. 12 and 13. Further examples are discussed in Seitz: "Image Based Transformation of Viewpoint and Scene Appearance", PhD Dissertation, Computer Sciences Department Technical Report 1354, University of Wisconsin—Madison, October 1997, the content of which is incorporated herein by reference.

Figure 12:
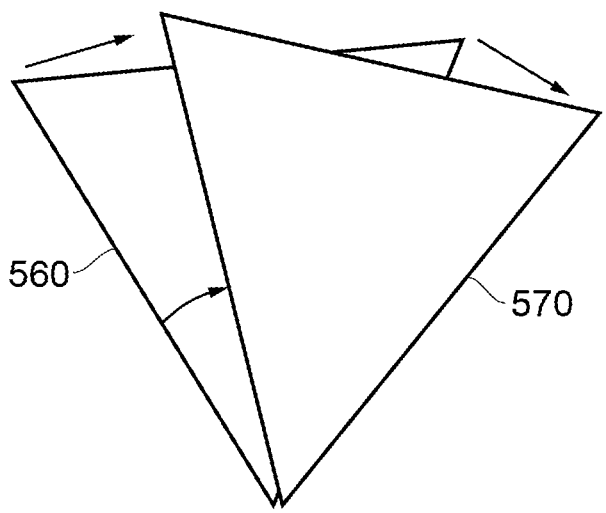
FIG. 12 schematically illustrates an image rotation.

FIG. 12 schematically illustrates an image rotation from a first view matrix 560 to a second view matrix 570. Reprojection of this type involves simply rotating and scaling the image so as to correct for any differences in field of view and orientation between the view matrix of the camera and the view matrix of the user viewpoint. Examples of this type of reprojection will be discussed below with reference to FIGS. 16 and 17.

Figure 13:
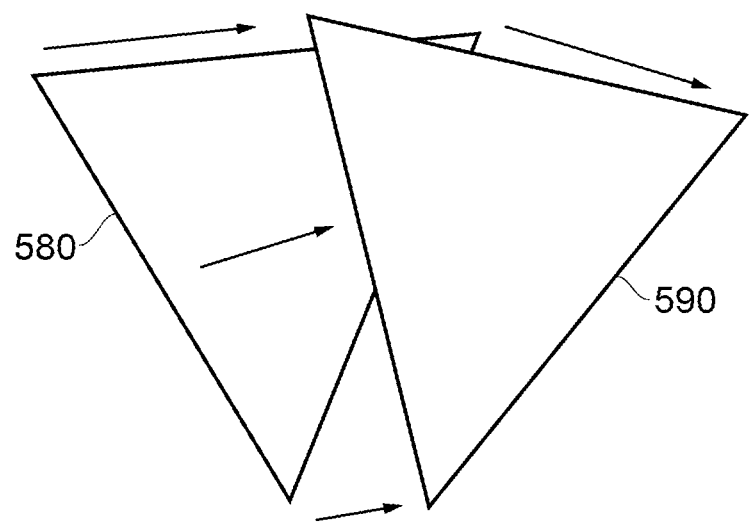
FIG. 13 schematically illustrates an image rotation and translation.

FIG. 13 schematically illustrates an image rotation and translation from a first view matrix 580 to a second view matrix 590. Here, the processing is slightly more involved, and may also use a depth map, indicating the image depth of different image features in the captured image, to allow the user viewpoint to be translated with respect to the viewpoint of the camera. Examples of the use of a depth map will be discussed below with reference to FIGS. 18-20.

Note that the images do not have to be camera-captured images. These techniques are all equally applicable to machine-generated images such as images generated by a computer games machine for displayed to the user as part of the process of playing a computer game.

Figure 14:
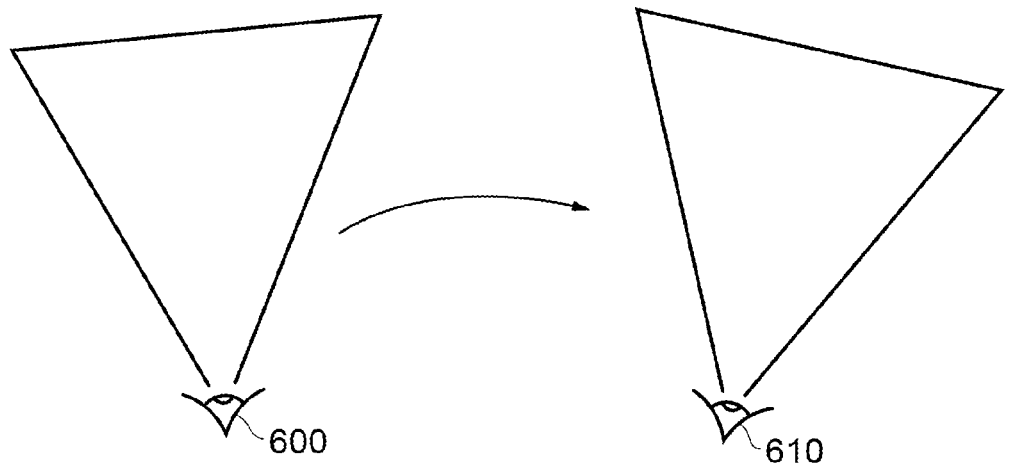
FIG. 14 schematically illustrates a latency issue with HMD image display.

FIG. 14 schematically illustrates a latency issue with HMD image display. As discussed above, the position and/or orientation of an HMD can be used, for example as discussed with reference to FIG. 9, so that an image for display is rendered according to the detected position and/or orientation of the HMD. In the case of viewing a portion of a wider captured image, or generating a required image as part of computer game play, the arrangement discussed with reference to FIG. 9 involves detecting the current position and/or orientation of the HMD and rendering an appropriate image for display.

However, the latency involved in this process can lead to an incorrect image being generated.

Referring to FIG. 14, consider a situation in which the user's viewpoint is rotating (in a clockwise direction as illustrated schematically in FIG. 14) from a first viewpoint 600 to a second viewpoint 610, over the course of a time interval of the order of an image repetition period of the image displays used in the HMD (for example, ½₅ second). Note that the two representations in FIG. 14 are shown side-by-side, but this is for the purposes of the drawing rather than necessarily indicating a translation of the user viewpoint (although some translation could be involved between the two viewpoints).

In order to allow time for the next output image to be rendered, the position and/or orientation of the HMD is detected when the HMD is at the viewpoint 600. The next image for display is then rendered, but by the time that image is actually displayed, the viewpoint has rotated to the viewpoint 610. The result is that the image is displayed is incorrect for the user's viewpoint 610 at the time that image is displayed. This can provide a subjectively poorer experience for the user, and may possibly lead to disorientation or even nausea on the part of the user.

Techniques which address this problem will now be discussed.

Figure 15:
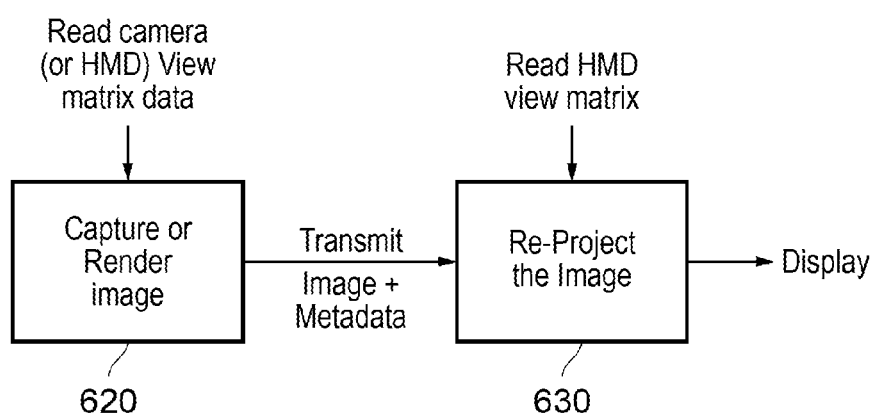
FIG. 15 is a schematic flow chart illustrating an image processing technique.

FIG. 15 is a schematic flow chart illustrating an image processing technique. The technique will first be discussed at a high level, and then more detail will be given below.

The features of the technique shown in FIG. 15 involve capturing or rendering an image (at a step of 620) according to the view matrix of the camera (in the case of a captured image) or the view matrix of the HMD (in the case of an image rendered by, for example, a computer game).

In the latter example, the image would be rendered according to the view matrix corresponding to the viewpoint 600 in FIG. 14. In other words, the technique involves detecting an initial position and/or orientation of the viewer's head and generating an image for display according to the detected position and/or orientation. The image is then transmitted or passed to the HMD along with metadata defining that view matrix (that is to say, the view matrix according to which the image was captured or first rendered). At the time of display, the HMD view matrix is again detected (in other words, detecting a current position and/or orientation of the viewer's head at a time at which the image is to be displayed) and, at a step 630, the image is reprojected based on the metadata indicating the original view matrix and the view matrix detected from the HMD at the time of display (in the terminology of FIG. 14, this would be the view matrix corresponding to the viewpoint 610, so that the technique involves associating metadata with the generated image, the metadata indicating the initial position and/or orientation of the viewer's head). So, the technique involves reprojecting the generated image according to any differences between the initial position and/or orientation and the current position and/or orientation of the viewer's head and displaying the reprojected image using the display.

In the case of a captured image, the view matrix of the camera is generally not within the control of the display arrangements and so this technique provides a way of compensating for differences between the two view matrices. In the case of image rendering, however, the issues are slightly different. However, a significant feature is that the time taken to process a reprojection operation can be much less than the time taken for a full rendering operation to generate an output image. In turn, this means that the rendering operation has to start earlier relative to the time of display which can lead to the latency problems with regards to detection of the appropriate viewpoint to use for the rendering operation, as discussed with reference to FIG. 14. By contrast, using the technique described with reference to FIG. 15, the rendering operation takes place relative to a viewpoint (such as the viewpoint 600) which is correct at the time that the rendering operation is initiated, but the viewpoint is then adjusted (to the viewpoint 610, for example) at the time of display. This avoids the need to try to predict the viewpoint 610 as far in advance, which could also lead to errors in the viewpoint, but provides an image for displayed to the user at the appropriate viewpoint corresponding to the display time. Accordingly, the technique can involve receiving an image and associated metadata, detecting a current position and/or orientation of the viewer's head at a time at which the image is to be displayed, reprojecting the received image according to any differences between the position and/or orientation indicated by the metadata and the current position and/or orientation of the viewer's head, and displaying the reprojected image.

In examples, the timing of the process can proceed as follows:

At a time $t_0$, the HMD view matrix data (representing the HMD's position at $t_0$) is detected. the step 620 is initiated and takes a period $T_{render}$.

At a time $t_0+T_{render}$, the required image has been rendered.

The image is then transferred to the HMD. This can take a period of zero or more seconds (the period would be zero if, for example, the image had been rendered at the HMD). But in general, a period $T_{delivery}$ is noted for the time taken to deliver the image to the HMD ready for display.

At a time $t_0+T_{render}+T_{delivery}$, the HMD view matrix data is again detected. This could correspond to the required display time, in which case (according to the derivation below) the image would be displayed late by an amount $T_{reproj}$, or it could be carried out at a time equal to a display time $T_{display}-T_{reproj}$. In either case it is carried out at a time dependent upon a required display time.

The image is then reprojected (at the step 630) to account for differences between the initial and the latest view matrices. The time period taken for the reprojection is $T_{reproj}$, assumed here to be much less than (or at least less than) $T_{render}$.

The image is then displayed at a time:

$$t_0 T_{render}+T_{delivery}+T_{reproj}.$$

Therefore, when the image is displayed, its maximum positional error corresponds to the movement of the HMD in the period $T_{reproj}$, whereas without the present technique, the maximum positional error corresponds to the movement of the HMD in the larger period $T_{render}+T_{delivery}$.

These are therefore examples of a generating step taking a period of time equal to at least an image generating latency, and a reprojecting step taking a period of time equal to at least an image reprojection latency, the image generating latency being longer than the image reprojection latency.

In the above examples, the detected initial position is detected at a latest time, allowing for the image generating latency and the image reprojection latency, to allow for the display of the reprojected image at the display time.

Worked examples of this technique will be discussed below.

Figure 16:
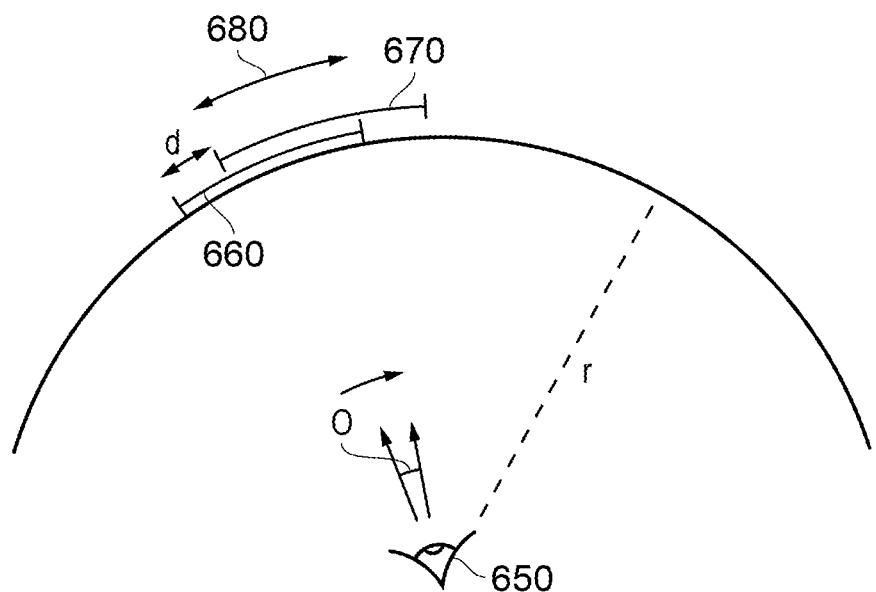
FIG. 16 schematically illustrates the rotation of an HMD.

FIG. 16 schematically illustrates the rotation of an HMD viewpoint 650 in a clockwise direction.

Figure 17:
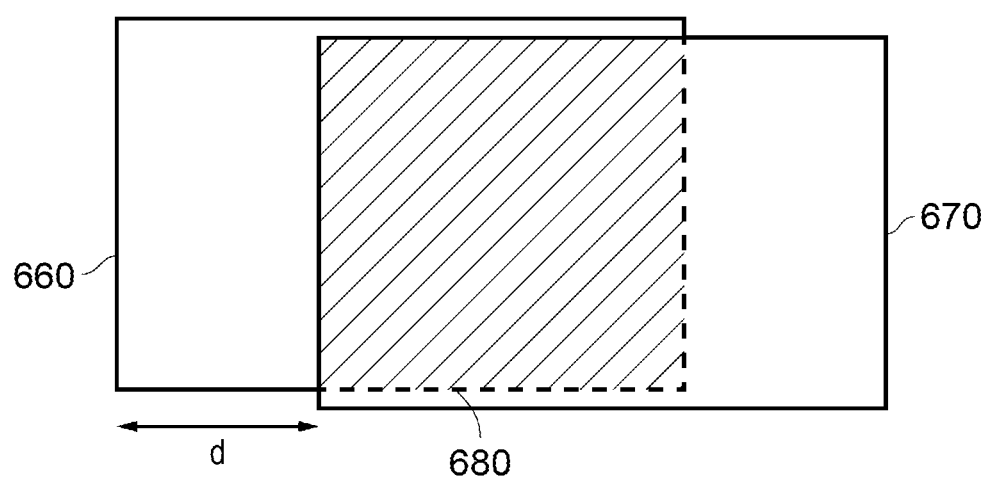
FIG. 17 schematically illustrates image position subtraction.

FIG. 16 is similar to FIG. 6 discussed above, in that the image for display is considered to lie on the surface of a sphere of radius r, where r is substantially equal to the distance from the user's eye to the virtual image generated by the HMD display system. Under this arrangement, a rotation of the viewpoint 650 by an angle θ can be considered as a lateral movement on the surface of the sphere of radius r by a lateral distance d=rθ. Such a displacement d is schematically illustrated in FIG. 17. If it is assumed that an image generated at the step 620 is represented by an image 660 in FIG. 16, and an image generated at this step 630 is represented by an image 670 in FIG. 16, it may be seen that the two images may be represented side-by-side from the point of view of the user. (Note that in FIG. 17, a small vertical displacement is shown just to allow the different images to be distinguished from one another in the drawing).

In a simple example, in order to generate (at the step 630) an appropriate image 670 for display to the user, a "subtraction" operation is carried out, which is a schematic term to illustrate the operation of detecting the overlap between the required display position of the image 670 and the actual position of the image 660, so as to display within the image 670 the overlapping portion 680 (shaded in FIG. 17) of the image 660. In other words, the reprojecting comprises detecting an overlapping portion between the generated image and the required reprojected image, and reproducing the overlapping portion as part of the reprojected image.

In embodiments of the present disclosure, the missing areas in the image 670 (those parts not shown as shaded) may be masked or filled in using image data from, for example, a panoramic image captured or prepared for this purpose and stored by the display arrangement. So, embodiments of the technique can therefore comprise filling portions of the reprojected image other than the overlapping portion with image material from a further image source.

Figure 18:
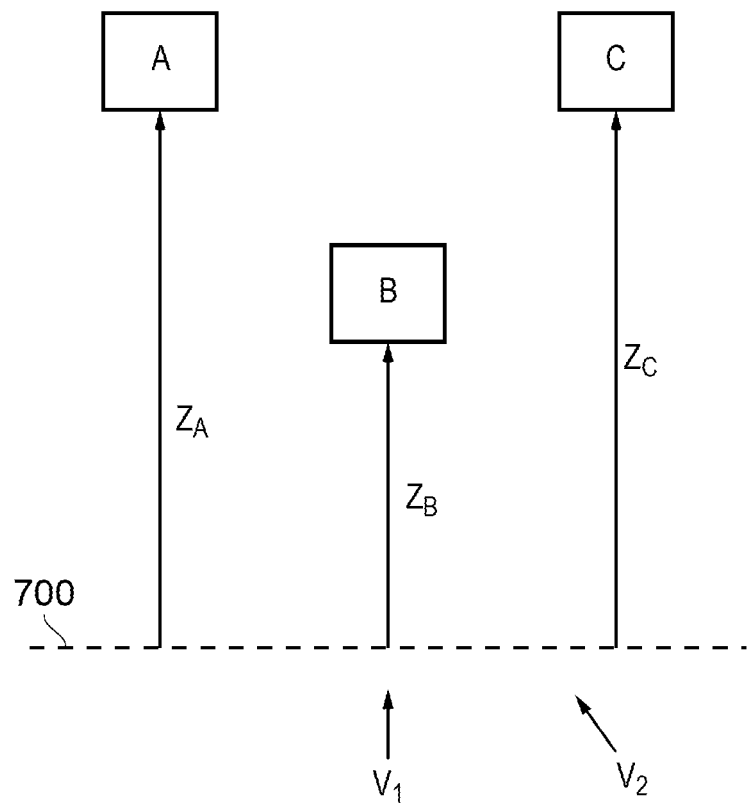
FIG. 18 schematically illustrates a depth map.

In order to reproject images by taking into account translations of the viewpoint, embodiments of the disclosure can use that information associated with the images. FIG. 18 schematically illustrates a depth map which may be derived, for example, from image data captured by a 3-D (binocular) camera or a so-called Z-camera, or which may be generated as part of the operation of a computer games machine's rendering engine.

In the schematic example of FIG. 18, three image objects labelled as objects A, B and C, are shown at respective image depths measured from an arbitrary depth position 700 of $z_A$, $z_B$ and $z_C$. Two potential viewpoints are shown, labelled as a viewpoint $v_1$ and a viewpoint $v_2$ respectively.

Figure 19:
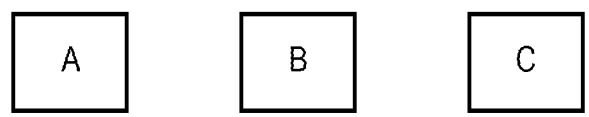
FIGS. 19 and 20 schematically illustrate images according to different respective viewpoints.
Figure 20:

FIGS. 19 and 20 schematically illustrate portions of images according to the viewpoint $v_1$ and the viewpoint $v_2$ respectively. At a rendering stage, the depth of each of the image objects is taken into account in generating the images. However, this technique can also be used at a reprojection stage such as that defined by the step 630 discussed above, so that image objects may be moved relative to one another in the reprojected image according to their respective image depths. Accordingly, the technique can involve providing depth data indicating the image depth of one or more image features, and the reprojecting can comprise repositioning one or more image features within the reprojected image according to the depth data.

Figure 21:
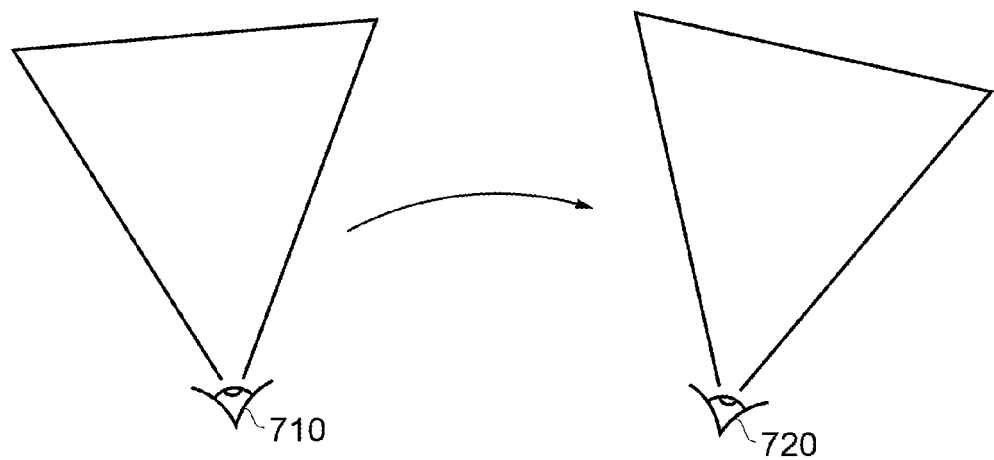
FIG. 21 schematically illustrates a technique for image rendering and reprojection to compensate for HMD motion.

FIG. 21 schematically illustrates a technique for image rendering and reprojection to compensate for HMD motion. In a similar manner to FIG. 14, a user viewpoint moves or rotates from a viewpoint 710, detected as part of the step 620 of FIG. 15, to a viewpoint 720 detected as part of the step 630 of FIG. 15 and according to which the image for display is reprojected. In this way, an image according to the correct viewpoint 720 is displayed to the user.

In more detail, FIG. 22 is a schematic flowchart relating to the technique shown in FIG. 21. In FIG. 22, process steps 800, 810, 820, 830, 840 and 850 are shown. Of these, the steps 800, 810 and 820 correspond generally to the step 620 of FIG. 15. The remaining steps 830, 840 and 850 correspond generally to the step 630 of FIG. 15. Note that in some examples, each of the steps in FIG. 22 could be carried out immediately (or substantially immediately) in response to completion of the preceding step.

At the step 800, the current position of the HMD (corresponding to the position 710 of FIG. 21) is detected and, at the step 810, is stored (for example in a temporary working memory forming part of the HMD or the computer games machine). At the step 820, an image for display is rendered according to the viewpoint 710.

At the time at which the rendered image is to be displayed, or at a time interval t before the instant at which the image is to be displayed, where t is the length of time required for the reprojection operation, the HMD position is again detected at the step 830 which, in this example, will detect the position 720. The image for display is reprojected as discussed above at the step 840 and is displayed to the user at the step 850.

The timing of the steps could be in accordance with the example timings discussed above.

Figure 23:
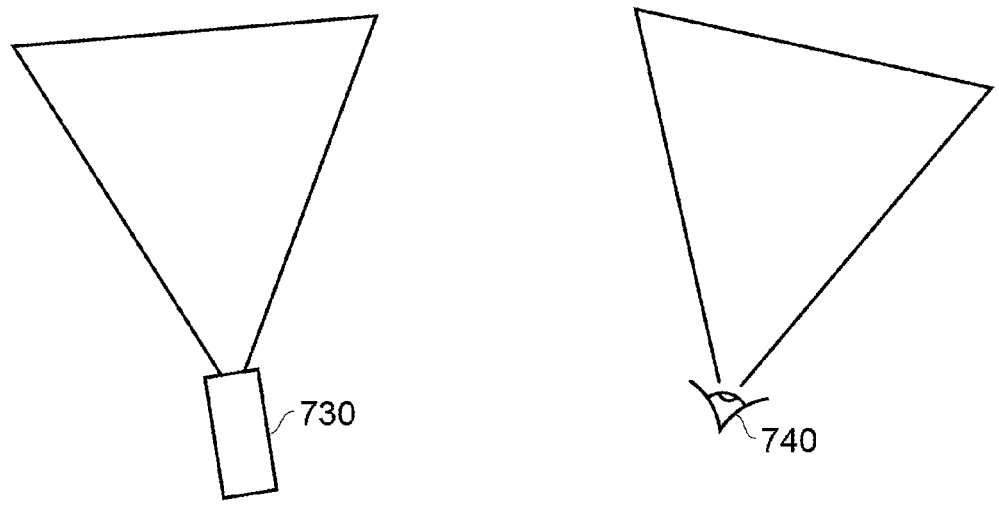
FIG. 23 schematically illustrates a technique for image capture and reprojection to compensate for different camera and HMD positions.

A similar example relating to captured images will now be discussed. FIG. 23 schematically illustrates a technique for image capturing and reprojection to compensate for different camera and HMD positions. In FIG. 23 a camera viewpoint 730 is different to an HMD viewpoint 740.

Figure 24:
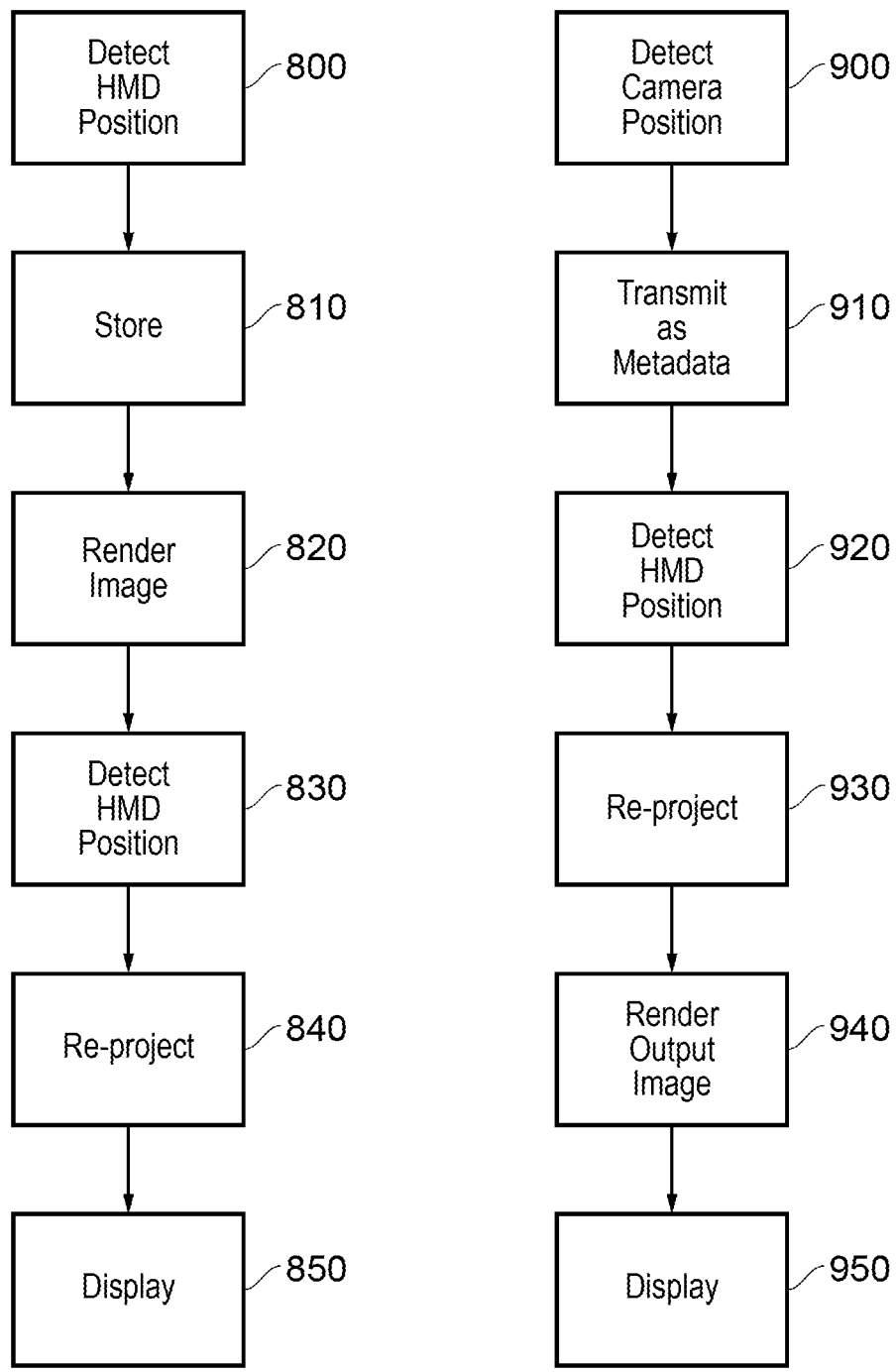
FIG. 24 is a schematic flowchart relating to the technique shown in FIG. 23.

FIG. 24 is a schematic flowchart relating to the technique shown in FIG. 23.

In FIG. 24, process steps 900, 910, 920, 930, 940 and 950 are shown. Of these, the steps 900 and 910 correspond generally to the step 620 of FIG. 15. The remaining steps 920, 930, 940 and 950 correspond generally to the step 630 of FIG. 15.

At the step 900, the current position of the camera (corresponding to the position 730 of FIG. 23) is detected and, at the step 910, is transmitted as metadata along with the captured image.

At the time at which the image is to be displayed, or at a time interval t before the instant at which the image is to be displayed, where t is the length of time required for the reprojection operation, the HMD position is detected at the step 920 which, in this example, will detect the position 740. The image for display is reprojected as discussed above at the step 930 and is rendered (at the step 940) for display to the user at the step 950.

Figure 25:
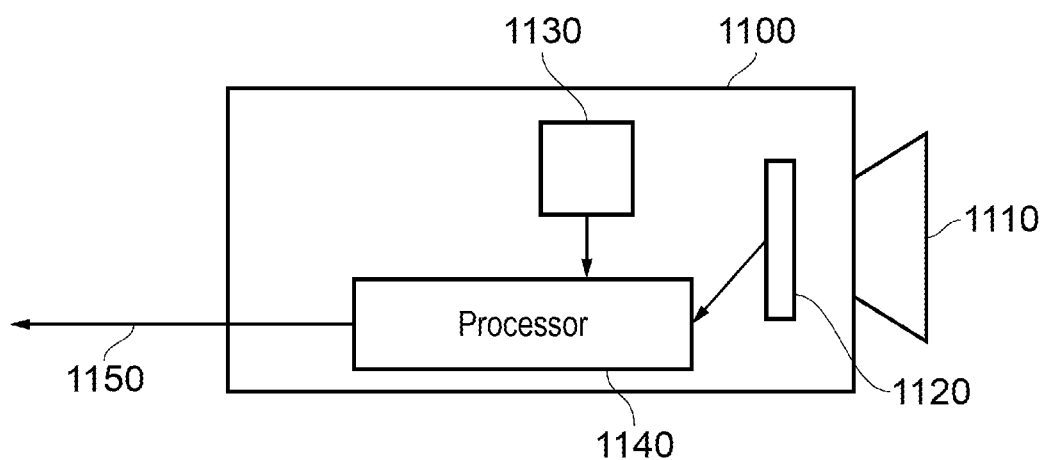
FIG. 25 schematically illustrates a camera apparatus.

The data-processing operations described above may be carried out at the video signal source 80 (for example, a computer games machine) and/or the HMD (in terms of all of the steps of FIG. 22 and the steps 920 . . . 950 of FIG. 24). The division between processing at the HMD and processing at the source 80 is a matter for the system designer; it may be desirable to reduce the size, weight and power consumption of the HMD for user comfort, which would make it appropriate to move as much processing as possible to the source 80. Alternatively, in order to reduce the amount of data which needs to be transferred between the HMD and the source 80, some of the processing may take place entirely at the HMD. In either instance, the processing may be carried out by appropriate programmable hardware operating under software control, for example. The steps 900, 910 of FIG. 24 may be carried out by a camera or (in a similar manner to the discussion above) by apparatus associated with a camera. For the purposes of example, FIG. 25 schematically illustrates a camera 1100 having this functionality. In FIG. 25, the camera 1100 comprises a lens arrangement 1110, and image sensor 1120 arranged to receive light through the lens arrangement 1110 and convert the light into an image signal, a position, orientation and/or motion detector 1130, which may be of the types discussed above in connection with detecting the HMD's position, orientation and/or motion, and a processor 1140 operable to carry out at least the steps 900, 910 using data from the detector 1130 and to output an image signal 1150 having associated viewpoint metadata as discussed above. Note that if optical flow motion detection is used as described earlier, the image data for this process may be simply derived from the sensor 1120, so avoiding the need for a separate detector 1130.

According to at least some embodiments of the present disclosure, by the addition of extra data in a video signal, an immersive video display such as a head-mounted display (HMD) is capable of reproducing images life-sized and in their correct orientation to the viewer. For interactive applications, the image reprojection can be performed rapidly and at the latest time just before display. This can reduce unwanted image movement caused by rendering latency. For any application, this technique can stabilise camera motion reducing viewer sickness and maintains the real world orientation of objects, improving immersion and realism.

In at least some embodiments of the disclosure, a single HMD could be used to reproject both interactive content and broadcast TV signals using the same technology. Some frame borders may be seen if the viewer is looking in a different direction to the camera, though this could be mitigated using supplementary panoramic still images to fill the gaps.

Embodiments of the disclosure can also address issues relating to video captured by a shaky camera, for example by a hand-held camera or a camera subject to outside influences on its motion, such as a camera mounted on a mechanical device or in the path of wind currents. By associating metadata with the image (as discussed above) indicative of the motion of the camera during image capture, reprojection is performed at the time of display using the techniques described above. In this way, a central region of the image can be compensated for camera motion and appear steady to the viewer, though the outer border of the image may move around as a result of the compensation.

Figure 26:
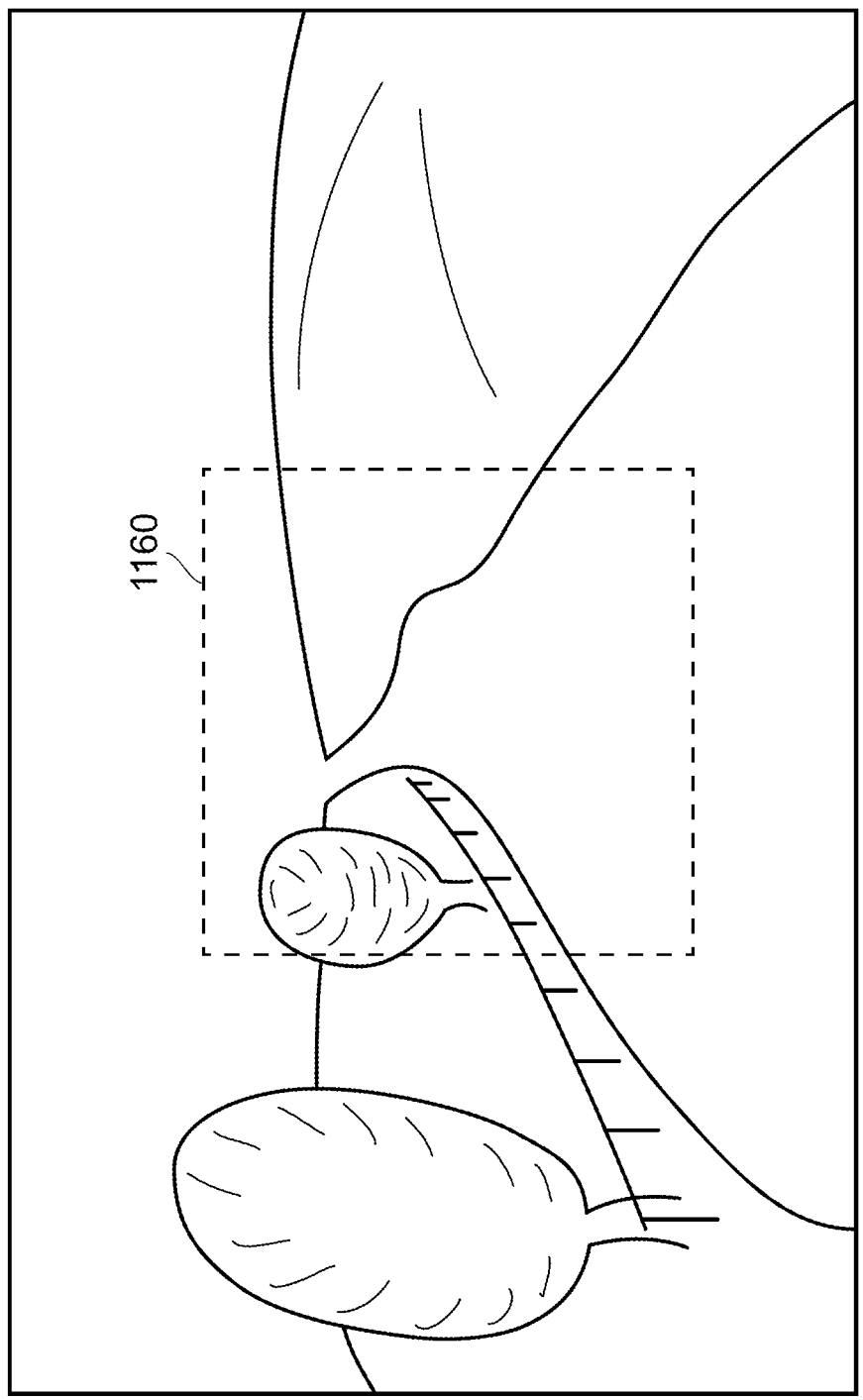
FIG. 26 schematically illustrates an example of a display image.

The example image shown in FIG. 26 is a lower-resolution background scene provided by an image signal displayed across the whole of the display screen, and a higher resolution insertion image provided by an image signal superimposed so as to replace a part of the lower resolution background scene.

The example schematically illustrated in FIG. 26 might form part of a video or a videogame relating to driving along a road surrounded by trees (shown very schematically in FIG. 26). Here, a background scene is generated and displayed at a lower resolution than an insertion image 1160 which is generated and displayed at a higher resolution. The insertion image 1160 relates to parts of the overall scene which the user will be concentrating on, namely (in this example) the road immediately ahead and any oncoming vehicles. The remaining background image (after insertion of the insertion image) relates to other parts of the overall scene which are less important to the users attention. One reason why this disparity in image resolution is used is because of the high processing overhead in generating an overall scene covering the entire display at a high resolution. Instead, the background may be generated at a lower resolution (and may be arranged so as to change less frequently than the insertion image) so as to save on processing overhead.

Note that the dashed lines indicating the extent of the insertion image 1160 are simply for clarity of the drawing and would not be present in an actual displayed image.

A further example relates to a video game, such that the overall background image could represent some or all of a virtual world. The scene relating to specific game action by a player is reprojected into the correct position within the virtual world as the insertion image.

Figure 27:
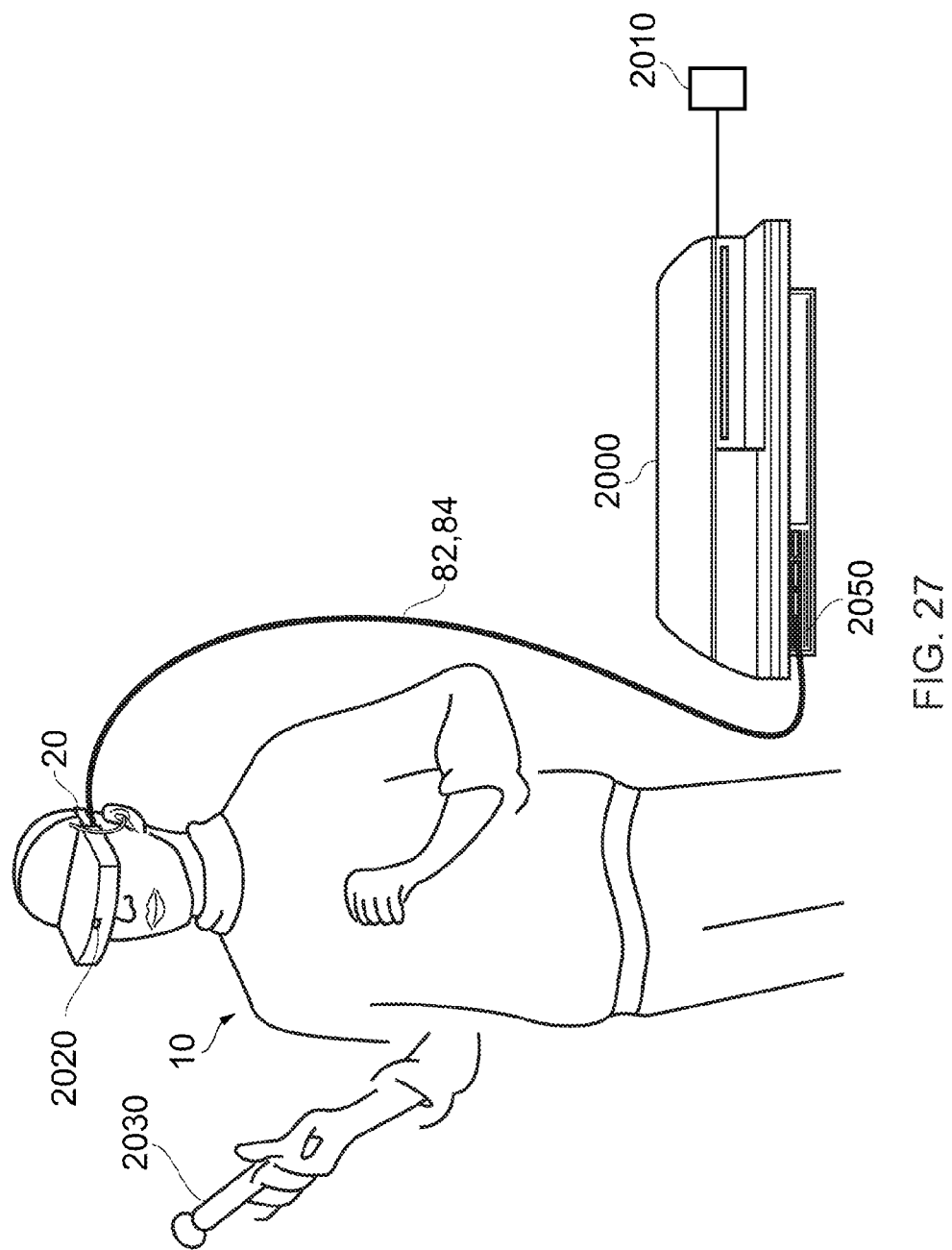
FIGS. 27 and 28 schematically illustrate a user wearing an HMD connected to a Sony® PlayStation 3® games console.

FIG. 27 schematically illustrates a user wearing an HMD connected to a Sony® PlayStation 3® games console 2000 as an example of a base device (corresponding to the external video source 80 of FIG. 1), a further example of a base device is a PlayStation 4® games console. The games console 2000 is connected to a mains power supply 2010 and (optionally) to a main display screen (not shown). A cable, acting as the cables 82, 84 discussed above (and so acting as both power supply and signal cables), links the HMD 20 to the games console 2000 and is, for example, plugged into a USB socket 2020 on the console 2000. Note that in the present embodiments, a single physical cable is provided which fulfils the functions of the cables 82, 84. In FIG. 6, the user is also shown holding a hand-held controller 2030 which may be, for example, a Sony® Move® controller which communicates wirelessly with the games console 2000 to control (or to contribute to the control of) game operations relating to a currently executed game program.

The video displays in the HMD 20 are arranged to display images generated by the games console 2000, and the earpieces 60 in the HMD 20 are arranged to reproduce audio signals generated by the games console 2000. Note that if a USB type cable is used, these signals will be in digital form when they reach the HMD 20, such that the HMD 20 comprises a digital to analogue converter (DAC) to convert at least the audio signals back into an analogue form for reproduction.

Images from the camera 2050 mounted on the HMD 20 are passed back to the games console 2000 via the cable 82, 84. Similarly, if motion or other sensors are provided at the HMD 20, signals from those sensors may be at least partially processed at the HMD 20 and/or may be at least partially processed at the games console 2000. The use and processing of such signals will be described further below.

The USB connection from the games console 2000 also provides power to the HMD 20, according to the USB standard.

Figure 28:
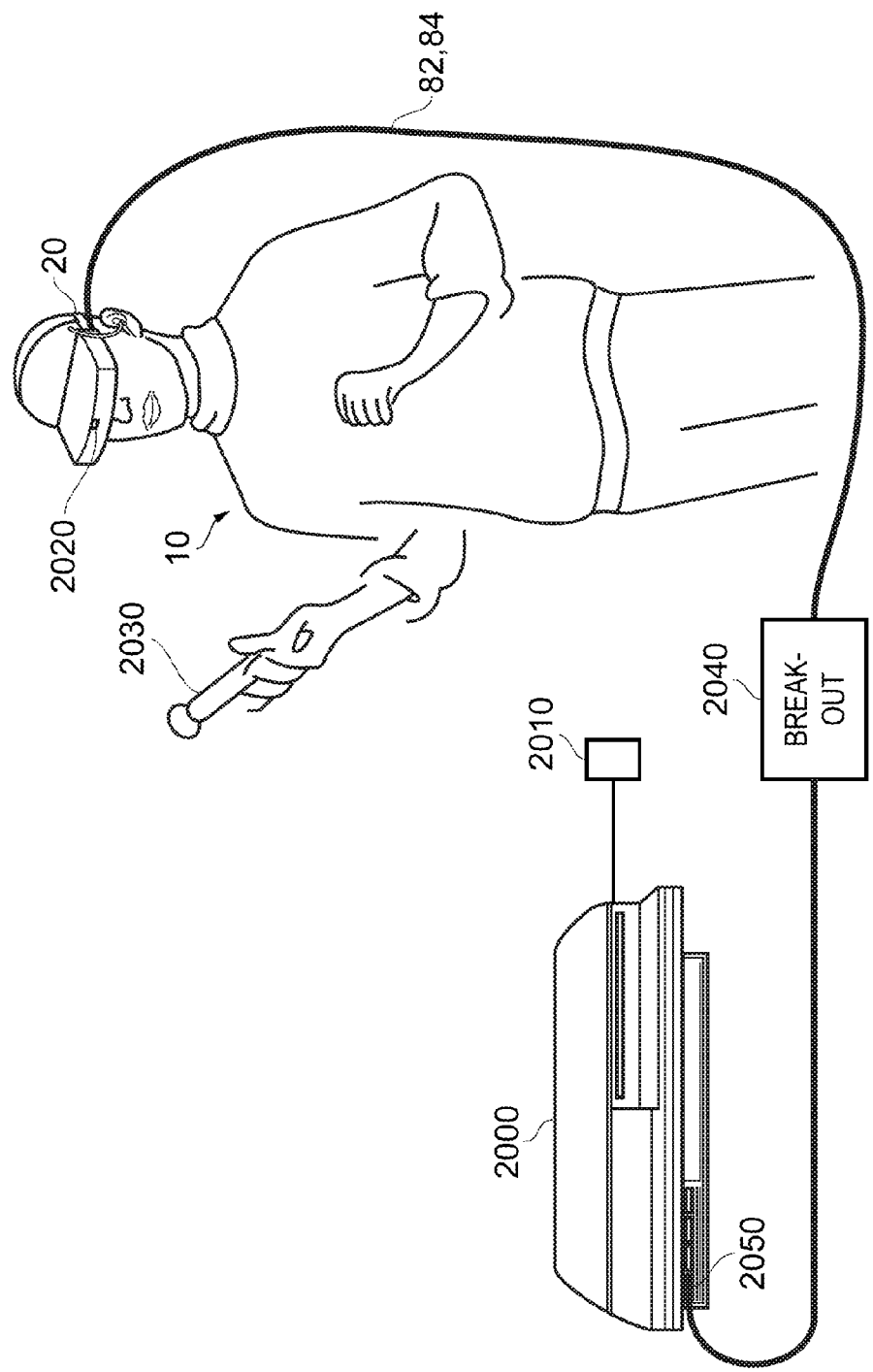

FIG. 28 schematically illustrates a similar arrangement in which the games console is connected (by a wired or wireless link) to a so-called "break out box" acting as a base or intermediate device 2040, to which the HMD 20 is connected by a cabled link 82, 84. The breakout box has various functions in this regard. One function is to provide a location, near to the user, for some user controls relating to the operation of the HMD, such as (for example) one or more of a power control, a brightness control, an input source selector, a volume control and the like. Another function is to provide a local power supply for the HMD (if one is needed according to the embodiment being discussed). Another function is to provide a local cable anchoring point. In this last function, it is not envisaged that the break-out box 2040 is fixed to the ground or to a piece of furniture, but rather than having a very long trailing cable from the games console 2000, the break-out box provides a locally weighted point so that the cable 82, 84 linking the HMD 20 to the break-out box will tend to move around the position of the break-out box. This can improve user safety and comfort by avoiding the use of very long trailing cables.

It will be appreciated that the localisation of processing in the various techniques described in this application can be varied without changing the overall effect, given that an HMD may form part of a set or cohort of interconnected devices (that is to say, interconnected for the purposes of data or signal transfer, but not necessarily connected by a physical cable). So, processing which is described as taking place "at" one device, such as at the HMD, could be devolved to another device such as the games console (base device) or the break-out box. Processing tasks can be shared amongst devices. Source signals, on which the processing is to take place, could be distributed to another device, or the processing results from the processing of those source signals could be sent to another device, as required. So any references to processing taking place at a particular device should be understood in this context. Similarly, where an interaction between two devices is basically symmetrical, for example where a camera or sensor on one device detects a signal or feature of the other device, it will be understood that unless the context prohibits this, the two devices could be interchanged without any loss of functionality.

As mentioned above, in some uses of the HMD, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion.

Figure 29:
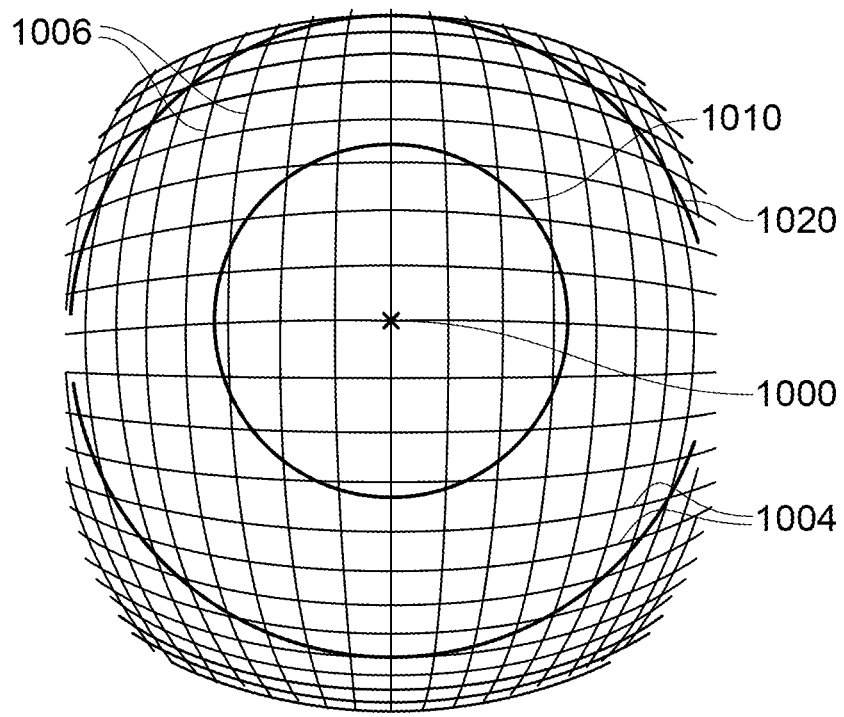
FIGS. 29 and 30 schematically illustrate an example of correcting a displayed image in response to a detected head motion.

FIG. 29 depicts an image that is centred on a point 1000 at an infinite distance from a particular viewpoint. The centre of the image has been defined to be the infinitely distant point 1000 so that a gauge of the angle of rotation can be made (by the reader of this description) in comparison to FIG. 30.

The image is generated for the position and/or orientation of a viewer's head at an initial time or for a predetermined viewpoint, and has been pre-distorted in such a way that when it is displayed to the user of the display device it will appear as a flat image that may occupy the user's entire field of view. This is because the image has been distorted utilising knowledge of the optical properties of the HMD display system and as such the distortion is able to complement (or at least partially or substantially complement) that of the HMD optics so that the image is displayed in a manner that appears undistorted to the user.

The example image contains a lattice of reference lines 1004, 1006 that act as markers to help identify the motion of the generated image in response to a detected head motion of the user. The horizontal reference lines 1004 link pixels that would appear on the same line of the image if it were undistorted, which is to say that each such horizontal line links pixels of common vertical position within the undistorted image. Similarly, vertical reference lines 1006 on the image each link pixels that would be in the same column of pixels in the undistorted image (i.e. equal horizontal position). The reference lines are therefore useful not only as a reference for inter-image motion, but also to demonstrate the distortion of the image that is applied to account for the optical properties of the HMD device. An inner circle 1010 and an outer circle 1020 are also present in the image, also to help distinguish (in the context of the present description) the motion between successive images.

In order for the image to be displayed correctly to the viewer, it is manipulated to appear in the correct position with the correct orientation relative to that of the viewer's head. In order to simulate a motion that complements that of the viewer's head the image displayed is displaced in the opposite direction to that of the motion. Note that as discussed above, the movement is detected by a motion detecting unit on the HMD such as a camera or accelerometer.

As discussed above, providing a new image in response to a new head position and/or orientation can be achieved by several methods; a first example is that the video image source could generate a new image that appears to be at the new viewpoint of the HMD user's head as sampled at or before the time at which generation of the new image is initiated—but this may be ineffective in terms of the time delay that is introduced ($T_{render}+T_{delivery}$ as discussed earlier) as the time taken for a new image to be generated may be long enough that the user's head has moved significantly further and thus the image as generated is not correct at the time of display. A second method that may be employed is reprojection, also as discussed in detail above. Using reprojection, an already-generated image (which may have been generated according to the latest available head position and/or orientation data at the time that generation was initiated) is further manipulated in order to appear to be seen from the correct viewpoint according to position and/or orientation data acquired just as the reprojection process is started. This can reduce the temporal error (between the time at which the latest position and/or orientation data is acquired and the time at which the resulting image is displayed) to $T_{reproj}$ as discussed above, where $T_{reproj}$ is somewhat less than $T_{render}+T_{delivery}$. However, reprojection may be difficult to implement in some applications because of the extra processing that is required in generating a first image and then producing a reprojected image based on this.

Accordingly, a third method (which is used in the presently described embodiment) is to use an approximation of the reprojection process. In this arrangement, a pixel mapping technique is employed which allows an approximation of a reprojection of an image in response to a change in viewpoint to be made by shifting pixels about the display in response to the detected head motion. This method does not require the generation of a new second image or the full use of geometrical reprojection, and therefore reduces the processing power required to display an image at the correct position and/or orientation. Also, because the time $T_{approximation}$ taken to perform this process can be even lower than the time $T_{reproj}$ taken to perform reprojection, the amount of head movement which is likely to occur (and which needs to be compensated for by this process) can be lower than that applicable to reprojection. This in turn can assist with the use of an approximation process, as approximating small effects can be easier than approximating large effects, simply because any errors introduced by the approximation process are likely to be less noticeable.

Before the approximation process is discussed in detail, an example of a lateral (side to side) rotation of the head without translation and without a change in pitch (up-down position) will be described with reference to FIG. 30.

Figure 30:
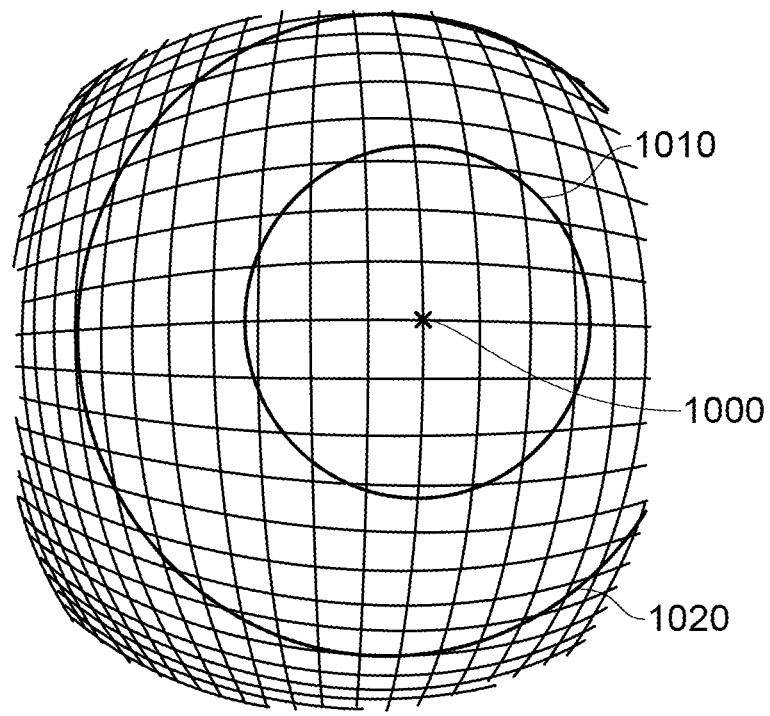

FIG. 30 schematically shows the HMD user's view (or rather, what the HMD user's view should be) of the image of FIG. 29 after the user's head has rotated laterally to the left.

The image in FIG. 30 has generally been translated horizontally towards the right, but it will be noticed that as features of the image motion, pixels at the centre of the image have been offset to the right by a greater distance than the pixels at the top and bottom of the image.

In particular, it may be noticed that the vertical lines 1006 in the image may be offset by a uniform amount across the image in both the horizontal and vertical directions, in response to a detected head motion in the opposite direction. In addition, due to the distortion that has been applied, the pixels may also be offset such that each row of pixels is offset by different amounts left or right to that of other rows of pixels in the image. This is again in response to a detected motion of the head in the opposite direction, and the technique shall be discussed in more detail below.

This process may also be carried out for the detected vertical head motion of the HMD user, but as the motion of the head in this plane is limited relative to that of yaw by physical considerations of neck motion (which is to say, the available range of side to side head rotation for the average person is greater than the available range of up/down motion), it is considered adequate to simply employ a vertical translation of the image rather than a full pixel mapping method. This reduces the amount of processing required, reducing the time delay between an image being generated and displayed. Further to this, a correction for the roll of the head (rotation of the head in the plane parallel to the displayed image) is considered unnecessary on this scale as it has little effect on the centre of the image (noting once again that only rotations taking place in the time period $T_{approximation}$ are relevant). This is because while the angular movement (in a head roll situation) is constant throughout the image, the actual displacement due to the rotation is proportional to distance from the centre of the image; and in the general case of HMD use the centre of the image contains the most important features (as the user will likely orientate their viewpoint to focus on important features). Implementing both or either of these approximations further improves the accuracy of predictions of HMD orientation in that the processing time for each frame is reduced by a greater amount than the reprojection approximation already offers, and thus predictions of the HMD orientation may be made closer to the time at which the corresponding frame is displayed. This means that the viewpoint of a displayed image is more likely to correspond correctly to the orientation of the HMD and the user's orientation.

The accuracy of the approximations may also be improved in that the reprojection approximation method is more readily applied to higher frame rate videos than that to which standard reprojection methods are suited, such as 120 Hz displays. This increased frame display rate means there is a shorter time and therefore less movement between frames, further justifying the approximations that are made. For instance, in the reduced time between frames the possible vertical motion of the head is even smaller than in the originally considered processing time and therefore the approximation of this motion as a simple translation is more accurate due to the small angles involved.

Figure 31A:
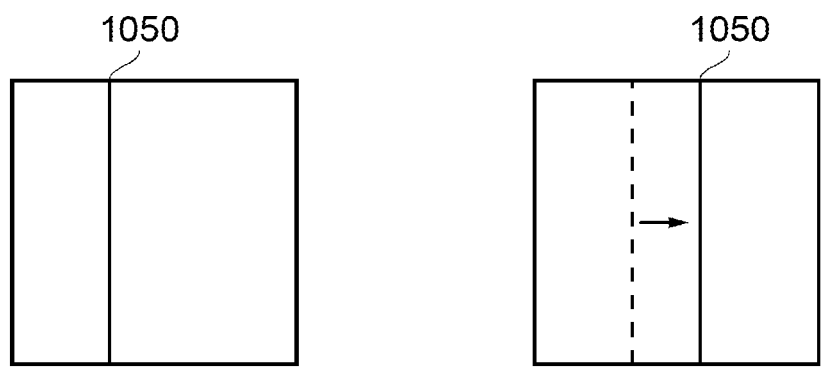
FIGS. 31a and 31b schematically illustrate implementations of possible image manipulations.

FIGS. 31a and b are schematic illustrations of possible manipulations to the generated image in order for it to carry out the approximation of reprojection.

The Figures schematically represent an image from the video image source, before (left hand side) and after (right hand side) a given transformation has been applied as part of approximating a reprojection process. These diagrams illustrate individual techniques which will be discussed in more detail below.

FIG. 31a shows a horizontal translation of each of the pixels in a column 1050 of the generated image towards the right side of the image, in response to the detected head motion of the user to the left. The same translation is also applied to other columns of pixels in the rest of the image uniformly.

Figure 31B:
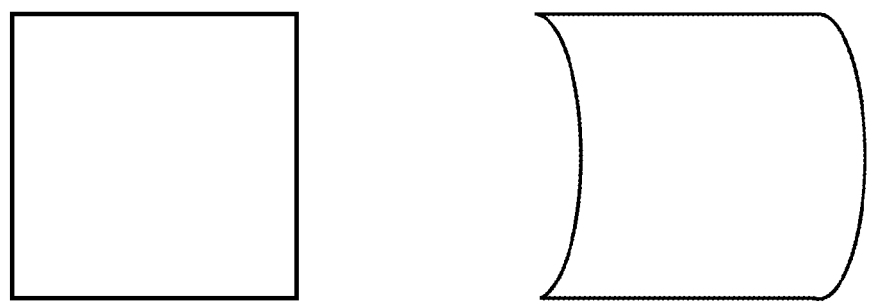

FIG. 31b is an illustration of offsetting pixels in conjunction with the translation of the image. This offset is undertaken such that all of the pixels that share a horizontal line on the image are shifted by the same amount. The lines closest to the top and bottom of the image have applied a smaller offset than those in the centre of the image in order to give the correct appearance as discussed above.

Figure 32:
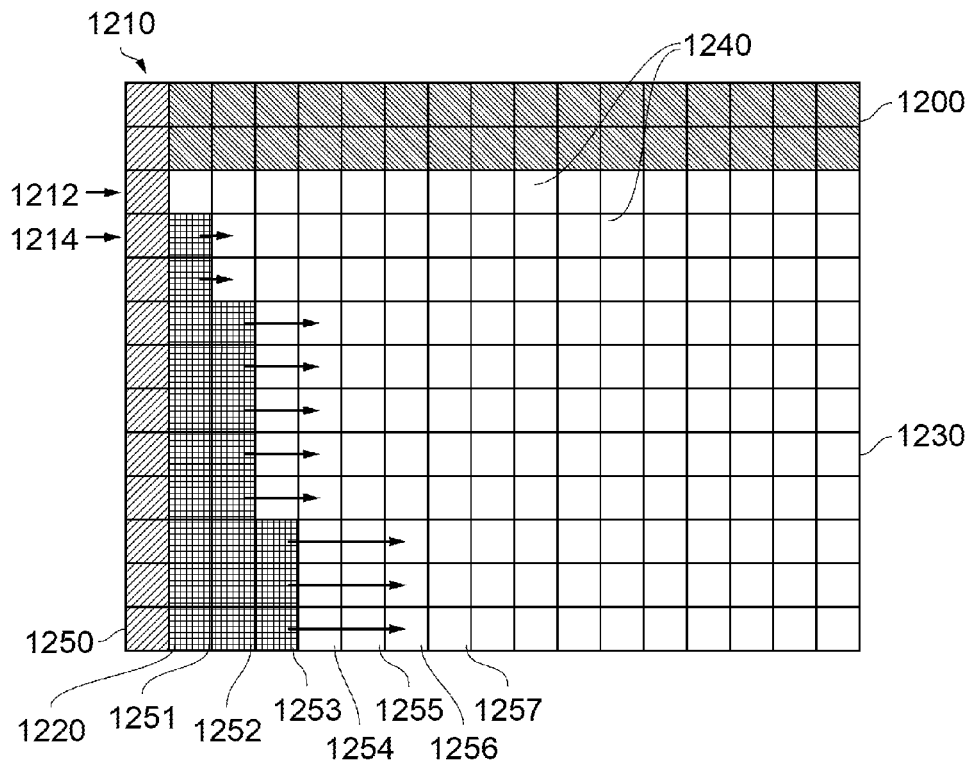
FIG. 32 schematically illustrates pixel translation.

FIG. 32 is a diagram showing an example of a pixel by pixel displacement of an image in order to provide an approximation of the reprojection process which would be required to correct for the change of a viewer's head position and/or orientation. Each square 1240 in the Figure represents a pixel, with each different translation of the pixels being distinguished by shading as detailed below. The Figure depicts a portion of an image to be displayed, for example the top left corner in the case of the viewer moving their head slightly upwards and to the left, and the motion of the pixels themselves.

As discussed above, compensation of pitch (up/down) motion can be approximated by a simple vertical shift of the image. Accordingly, in the present example of a slight upwards motion of the head (during the time period $T_{approximation}$) the approximation of the compensation is provided by a pixels shift downwards by an amount dependent upon the magnitude of the vertical head rotation in the period $T_{approximation}$. In particular, in the example of FIG. 32 all of the pixels in the image are translated uniformly downwards to account for a user tilting their head upwards. The magnitude of the displacement in this example is two pixels, so that two rows of pixels (drawn as a shaded region 1200) are blank, and all other pixels in the image correspond to pixels which were two rows higher in the image before the present process was applied. This therefore provides an example of applying a vertical pixel displacement to the image in dependence upon a difference in vertical rotation between the initial orientation of an HMD and a detected current orientation of the HMD (where "current" implies an orientation at the time of the detection, which in turn can be (in at least embodiments) close to the display time of the image).

Compensation of lateral (side to side) rotation during the time period $T_{approximation}$ can be compensated by a horizontal translation in which some or all of the pixels in the image are translated leftwards or rightwards. The horizontal shift, which is drawn in this example towards the right (in response to a leftward head motion), may have a component common to all rows of pixels, and a component which varies between rows. In the example shown, the component common to all rows is a shift of one pixel to the right, so that a leftmost column 1210 of pixels is blank, and all other pixels in the image correspond to pixels which were at least one pixel position to the left in the original image (before the present process was applied). However, the common component could be zero. Additionally, at least some pixels are further offset horizontally, which is to say that their offset is greater than or at least different to the component common to all rows of pixels. The magnitude of the offset varies with vertical row position.

With regard to the variable offset, a top row 1212 of pixels (just below the rows 1200) does not undergo any translation beyond the common component discussed above. The next row below (a row 1214) is further translated rightwards by a small amount (one pixel in this example). The further displacement (beyond the common component) generally increases for rows closer towards the centre of the image, noting again that the portion represented by FIG. 32 is indicative of an upper left corner region of a larger image. As drawn, the rows of pixels at the bottom of FIG. 32 (that is, those that are nearest the centre of the image as a whole) are translated by the greatest amount (of those rows shown), representing a further displacement of three pixels. The result is a manipulated image that fills the area 1230 and is ready for display by the HMD. Note that the lower portion of the image is not shown in FIG. 32, but the pixel displacements would generally tend to decrease towards the bottom of the image (for other than zero or near-zero changes in position and/or orientation). This provides an approximation of the reprojection process. This is an example of the lateral displacement being greater for a subset of pixel rows towards a vertical centre of the image than for another subset of pixel rows towards a top or bottom of the image. The displacements may increase monotonically on moving from the top or bottom of the image towards the vertical centre. Multiple adjacent rows of pixels may have the same displacement.

The horizontal translations are dependent upon the difference between the initial position and/or orientation of the HMD and the detected (later) position and/or orientation at the time at which the image is to be displayed. Applying the horizontal displacements involves applying a lateral displacement to at least a subset or rows of pixels, the lateral displacement depending upon the difference in position and/or orientation between an initial and a current (time of display, or time or initiation of the reprojection approximation) value. The lateral pixel displacement may also depend upon the pixel row.

Note that if the detected difference in position and/or orientation is zero or near zero, a full reprojection process might make no difference (or substantially no difference) to the image, and so an approximation of the reprojection process using the present techniques also makes zero or little difference. In such instances, there may be little or no pixel shift and little or no difference by vertical row position. But the pixels shifts and differences are still dependent upon the detected changes, and at least for detected changes of at least a predetermined magnitude, the lateral pixel displacement is greater towards the vertical centre of the image.

The step 1310 may also be applied.

Techniques for implementing the pixel shifts will be discussed below.

The translations discussed above may of course leave some pixel positions unpopulated by pixel information, in the example of FIG. 32, these are the rows 1200, the column 1210 and a region 1220. Several examples of blanking methods to populate these pixel positions exist, of which some are now described with reference to FIG. 32. One possibility is to populate these pixel positions with black pixels, on the grounds that these will not be visible to the HMD user (partly because they are black pixels and partly because they are at the extreme periphery of the user's vision).

Another possibility is to introduce the so-called 'leaking' of pixel values. This is when pixel values from the end of one row of pixels (for example, the far right hand side of row 1212) are reproduced at the start of the next line (for example, the far left hand side of row 1214). This may be implemented in either direction, so for example the far right pixel of row 1214 may be reproduced in the first pixel of row 1212. The leaking may also occur from either side of the row (such as a left side to left side mapping) or from rows that are not adjacent to the row being rendered.

A third possible method to populate unoccupied pixel positions is to create 'fake' data. A first option for this is to duplicate the first occupied pixel position into the positions before it, such that every pixel in a line is the same until after the first originally populated pixel position is reached. In FIG. 32, an example of this corresponds to the positions 1250-1253 all having the same value as the pixel 1254. An alternative to this is the reverse drawing of data. This takes the first populated pixel position values and reproduces them in the unpopulated positions. In FIG. 32, this is exemplified by a mapping such that pairs of matching pixels are displayed: 1250=1257, 1251=1256, 1252=1255 and 1253=1254.

Pixel values which, according to the translations under discussion, would be translated out of the active images area may simply be discarded.

In some embodiments, the approximation technique as discussed above may simply be used in place of the step 840 in FIG. 22 or the step 930 in FIG. 24 discussed above.

In FIG. 32, a processing step comprises applying a lateral pixel displacement to at least a subset of rows of pixels, the lateral pixel displacement depending on a difference in lateral rotation between the initial orientation and the detected current orientation of the head mountable display device. For example, the lateral displacement may be different for two or more subsets or groups of rows of pixels.

The lateral displacement may be greater for a subset of pixel rows towards a vertical centre of the image than for another subset of pixel rows towards a top or bottom of the image.

The processing step may comprise applying a vertical pixel displacement to the image in dependence upon a difference in vertical rotation between the initial orientation and the detected current orientation of the head mountable display device.

The processing step may comprise generating the pixel displacements as a function of pixel position in the image and the difference between the initial orientation and the detected current orientation of the head mountable display device.

Other possible aspects and features of implementations of these techniques will now be described with reference to FIGS. 33 to 36.

Figure 33:
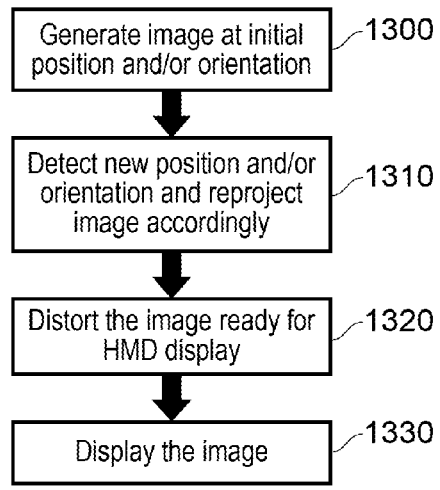
FIGS. 33 and 34 are schematic flowcharts that illustrate reprojection and manipulation processes.

FIG. 33 is a flow chart that exemplifies parts of the method described earlier (with reference to FIGS. 22 and 24) by which the manipulation of a video image can be performed.

At a step 1300 an image is generated by a video image source (for example, the games console 300 of FIG. 27 or a camera such as the camera of FIG. 25) with a viewpoint corresponding to an initial position and/or orientation. This position and/or orientation may be either predetermined by the application that is running on the console, or based upon the camera position, or based upon the detected position and/or orientation of the user of the connected HMD device, for example at the time that generation of the image is initiated.

At a step 1310 a new position of the user is detected (for example, just before the display time for that image) and the image to be displayed is reprojected (or a reprojection is approximated as discussed above) to correct for this change in position. After this in a step 1320, the reprojected image (or the image with an approximation of reprojection) is distorted to compensate for the optics of the HMD device in order for it to be displayed correctly. Finally at a step 1330 the distorted image is displayed at the HMD with the correct distortion and viewpoint.

Accordingly the step 1300 is similar to the steps 800-820 of FIG. 22 or the step 900 of FIG. 24. The step 1310 is similar to the steps 830-840 of FIG. 22 or the steps 920-930 of FIG. 24. The step 1320 does not have an equivalent in FIG. 22 or 24. The step 1330 is similar to the steps 850 (FIG. 22) or 950 (FIG. 24).

FIG. 33 therefore provides an example of an image processing method for a head mounted display device, operable in respect of an image generated for display by a head mountable display device according to an initial position and/or orientation of a viewpoint, the method comprising:

detecting a current position and/or orientation of the head mountable display device depending upon a display time at which the image is to be displayed; and processing the image using pixel position mappings in which at least a subset (for example, only a subset; for example, different subsets having different processes) of pixels of the distorted image are displaced by respective pixel displacements dependent upon the difference between the initial position and/or orientation and the detected position and/or orientation of the viewer's head at the time at which the image is to be displayed.

Figure 34:
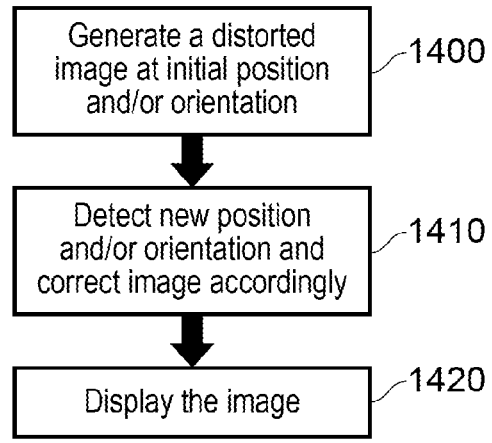

An alternative to this is outlined in the schematic flowchart of FIG. 34.

In this process, the video image source generates a distorted image, for example in respect of a predetermined viewpoint, a current camera viewpoint or a detected position and/or orientation of the HMD device in a step 1400. The distortion of the image is such that it compensates for the optics of the HMD device as discussed above in order to produce an image that may be displayed correctly. The step 1400 encompasses either generating the image in a distorted form, or generating it as a conventional image and then applying a distortion.

At a step 1410 the current position and/or orientation of the user of the HMD is detected and the distorted image is manipulated, according to a pixel mapping process approximating a reprojection process, as detailed earlier in the present text, with translations of the pixels in the horizontal and/or vertical directions to simulate a rotation of the viewpoint.

Finally, the image is displayed to the user of the HMD at a step 1420.

Next, two possible implementations of the correction process in the step 1410 described in FIG. 34 will be discussed with reference to FIGS. 35 and 36.

In these examples, only the correction with regards to a variation in yaw (lateral rotation) is discussed, as this can be implemented separately to corrections for pitch. However, it will be appreciated that corresponding techniques (though potentially rather simpler) can be applied for pitch correction, for example by applying a vertical pixel displacement to the image in dependence upon a difference in vertical rotation between the initial orientation and the detected current orientation of the head mountable display device.

The yaw information can be based upon position and/or orientation data supplied by any of the head position and/or orientation detection arrangements described earlier, from which is subtracted the position and/or orientation at which the image was captured or generated, so as to provide a yaw amount for which correction is required at the step 1410.

Figure 35:
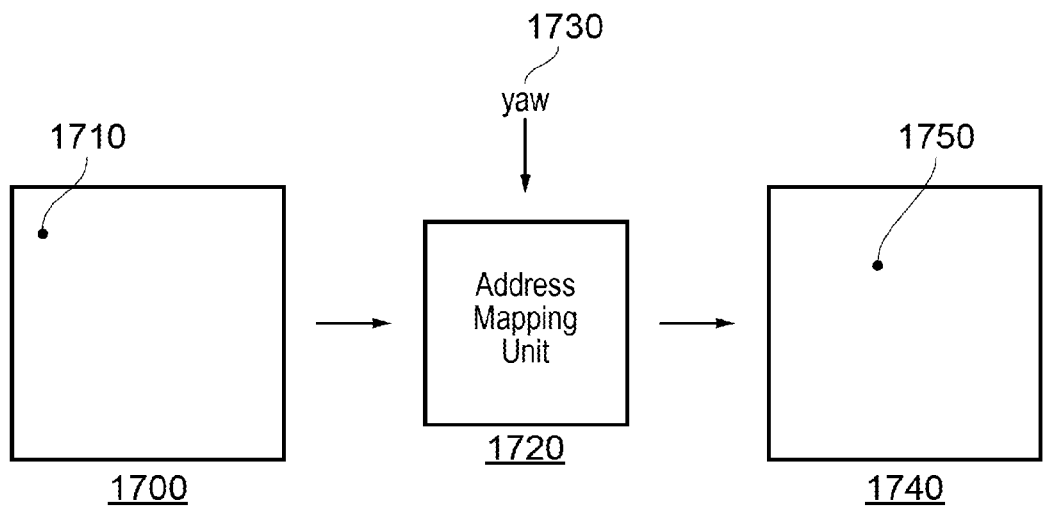
FIGS. 35 and 36 schematically illustrate address mapping.

FIG. 35 illustrates a possible method for implementing the image manipulation as described above. In this arrangement, a buffer 1700 stores a generated image (in this example, a distorted image to compensate for the HMD optics), or a part of the generated image, that is to be displayed at the HMD. An example pixel 1710 is shown. The yaw data 1730 as detected by the HMD (not shown) is input into an address mapping unit 1720 to implement the pixel mapping technique to account for the motion of the HMD. The address mapping information is then used to read pixels from pixel positions in the buffer 1700 and write those pixels to a second buffer 1740, so that pixels of image stored in the buffer 1700 are translated to new locations as determined by a pixel mapping provided by the address mapping unit 1720. This process is shown in schematic terms by a pixel 1750, which corresponds to the pre-mapping pixel 1710 form the buffer 1700, but now at a different image position according to the mapping imposed by the address mapping unit 1720. The contents of the buffer 1740 may then be read out for the image to be displayed to the user.

Figure 36:
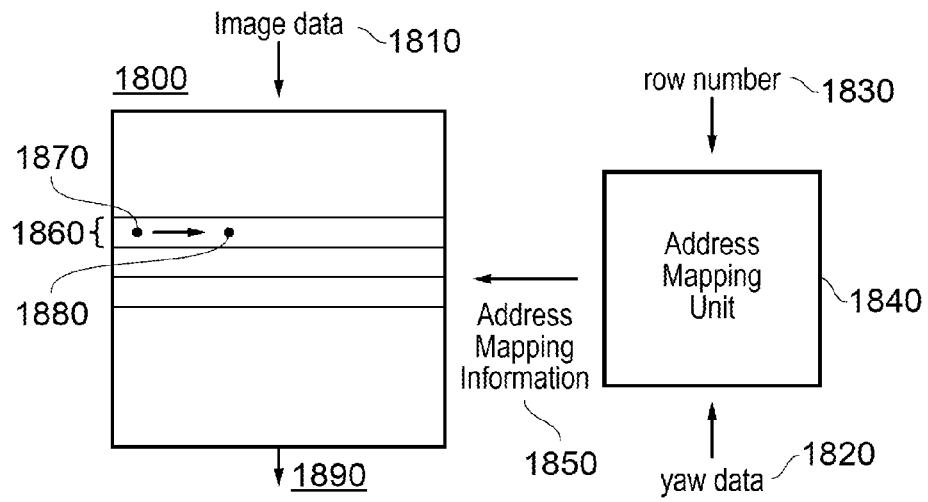

An alternative to this arrangement is schematically illustrated in FIG. 36, which uses only a single buffer 1800 rather than the two buffers of FIG. 35. The buffer 1800 may contain the whole of the generated image, or only a few rows 1860 of pixels; for example, a few most recent rows at any time. The number of rows stored could be linked to the expected or allowable maximum pitch change of the HMD in the processing time $T_{approximation}$ of the image. For example, if a maximum change in pitch was determined to correspond to a maximum 10 row displacement of the pixels in either direction, then it is possible that only 21 lines are stored in the buffer as it would then be possible to map between all of the possible variations in vertical displacement with this amount of buffered data. The amount of data to buffer is kept as low as possible, while still allowing the required pitch corrections to be applied, in order to maintain a low latency (and so a low value of $T_{approximation}$).

An address mapping unit 1840 of FIG. 36 may be configured to provide the address mapping information 1850 to control either the writing of image data 1810 into the buffer 1800 or reading of image data from the buffer, so as to provide a corrected image 1890.

Firstly, a technique by which the address mapping information 1850 is used upon writing image data into the buffer 1800 is described. In this method, row number data 1830 of the pixels that are being considered are input to the address mapping unit along with the detected yaw data 1820 (that is to say, the difference between the position and/or orientation relating to the generation or capture of the image and the current position and/or orientation of the HMD). The address mapping unit generates address mapping information 1850 so as to cause the image data 1810 to be stored in the buffer 1800 with the pixels already displaced according to the head motion, for example a pixel relating to a pixel position 1870 of the originally generated image may be stored at a pixel position 1880 instead. The HMD display (not shown) is then able to read the image data from the buffer and display it without further mapping as the correct image 1890 for the detected change in position and/or orientation of the HMD.

A second implementation of the arrangement of FIG. 36 is one in which the address mapping information 1850 is used upon reading of the image data 1810 from the buffer 1800. Similar to the first implementation, the row number information 1830 is provided along with the yaw data 1820 to the address mapping unit 1840 in order to produce address mapping information 1850 that describes the translation of the pixels in the image to account for the detected motion of the HMD. The address mapping information 1850 is then used upon the reading of the image from the buffer 1800, such that the pixel to be displayed at position 1880 is instead read from the position 1870 in the buffer 1800. This results in a corrected image 1890 being displayed to the viewer in response to their position and/or orientation.

In either of FIG. 35 and FIG. 36, the address mapping function applies a lateral and, if pitch is also taken into account, vertical pixel shift to pixel positions depending on the difference in head position and/or orientation between the image generation and the image display times. The horizontal and vertical components of the shift may be derived separately as follows.

Regarding the vertical component, note that in the discussion above the vertical component is the same for the whole image. There is therefore just a single value to be derived by the address mapping unit, either as a mathematical function of the pitch amount such as:

number of rows shifted=integer value of(pitch variation*constant)

or by a look-up table associating pitch values (or ranges of pitch values) to number of vertical pixel positions to be shifted.

The horizontal component of the shift varies not only according to the yaw value, but also from row to row. This can also be derived by the address mapping unit as a mathematical function of yaw value, for example:

shift(n)=integer value of (sin(nπ/N)*(yaw variation*constant))

where n is a pixel row number counting from the top or bottom of the image, and N is the total number of pixel rows in the image.

Alternatively, the pixel shift for each row can be found by the address mapping unit using a look-up table. Here, a single look-up table, just giving a base shift value as a function of row number (or ranges of row numbers) could be used, with the result being scaled by the address mapping unit according to a value (yaw variation*constant), or a two-dimensional look-up table could be used giving pixel shift as a function of both yaw amount and row number (or ranges of row numbers).

Figure 37:
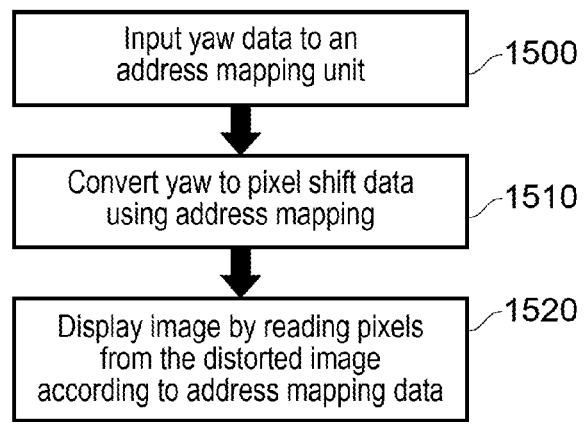
FIG. 37 is a schematic flowcharts exemplifying an address mapping process.

FIG. 37 is a schematic flowchart relating to the operation of the apparatus shown in FIG. 35 or FIG. 36.

In FIG. 37, data about the detected head motion (in this case, yaw) is supplied to the address mapping unit 1720 at a step 1500, and is used to relate the magnitude and direction of an angular head motion to a magnitude and direction of pixel displacement. The address mapping unit processes the input yaw data in a step 1510 in order to output a set of pixel shift data that produces the appropriate mapping to correspond to the detected motion of the users head.

In a step 1520 the mapping data is used as discussed above—for example to read out the pixels of the generated distorted image from a different location to that at which they were stored, or to write pixels into a different location in a buffer, or to transfer pixels from one buffer to another but with a location translation. This results in an image in which the pixels have been shifted from their original positions as originally generated. The shift that is applied is such that the yaw of the user's head will be accounted for.

Figure 38:
FIG. 38 schematically illustrates a buffer used in the mapping process.

FIG. 38 is an example of an image buffer 1900 usable as the buffer memories 1700, 1740 or 1800 in respect of a system in which there is no manipulation of the generated image in response to a detected change in pitch. The means that the image buffer 1900 may take the form of a one line pixel buffer, as extra lines are not required to enable pixel mapping between them. The buffer may be arranged to store a number of pixels that equates to a predetermined amount of yaw (for example, large enough that sufficient pixels are able to be buffered to deal with approximately 5° of yaw, which is considered the upper limit for human head motion for lateral rotations in an image period). Storing this many pixels in the buffer therefore allows for a sufficient degree of pixel mapping to accommodate the predetermined limits on head motion. As an example of a specific implementation, the algorithm can be executed using a row (scanline)-based 2D display controller or a shader.

To execute the algorithm with a shader, in an example implementation two sampler inputs and one float4 constant may be used. The first sampler input is the distorted 1080p image as coming from the games machine. The second sampler input is a 1D lookup texture described below. The float4 constant contains the image (x,y) shift in pixels and the yaw delta (difference between initial and current positions/orientations), foe example expressed in degrees.

The 1D lookup texture is used for per-scanline shifting of the image to achieve the following: (a) It contains an x pixel shift value for each scanline; and (b) The shift is in number of pixels shifted per 1 degree yaw, divided by the screen width in pixels.

Example C++ code to set up the shader constant (shader-Const) is shown below:

```
// pitchInDeg and yawInDeg are the relative pitch and yaw rotation in
this frame const float kScrollScaler = 12.2f; <- this is the number
of pixels shifted per 1 degree float codedYaw = (-yawInDeg *
kScrollScaler) / kScreenWidth; <- kScreenWidth is 1920 float
codedPitch = (pitchInDeg * kScrollScaler) / kScreenHeight; <-
kScreenHeight is 1080 Vector4 shaderConst = Vector4(codedYaw,
codedPitch, yawInDeg, 0.0f); <- our result
```

Example shader code to run the algorithm is as follows:

```
float4 PostDistortReprojectionPixelShader(PixelInputType input) :
SV_TARGET
{
    // first we add our overall image shift to the UV's
    input.UV += shaderConst.xy;
    // then we subtract our pixel shift for this scanline based on the yaw
    input.UV.x -= LookupTexture.Sample(SampleType, input.UV.y).r *
    shaderConst.z;
    // and finally we return the pixel at this location
    return float4(shaderTexture.Sample(SampleType, input.UV).rgb, 1.0f);
}
```

Alternatively, at a display controller the algorithm can be performed at scan-out in the following way: (a) Pre-calculate display fetch positions for each scan line; and (b) Handle display fetch per scan line using the pre-calculated data.

The pre-calculated data for each scan line may contains a fetch address (where to start reading the source image) and a delay time before fetching (how long we wait before we start fetching).

In a 1920×1080 image, the following would be used at the start of each scan line for reprojection. The delay is provided in terms of pixels instead of time to make it easier to understand.

ADR=0/DELAY=1920
ADR=0/DELAY=1920
ADR=0/DELAY=1
ADR=1920/DELAY=2
ADR=3840/DELAY=2
ADR=5760/DELAY=3
ADR=7680/DELAY=3
ADR=9600/DELAY=3
ADR=11520/DELAY=3
ADR=13440/DELAY=3
ADR=15360/DELAY=4
ADR=17280/DELAY=4
ADR=19200/DELAY=4

Figure 39:
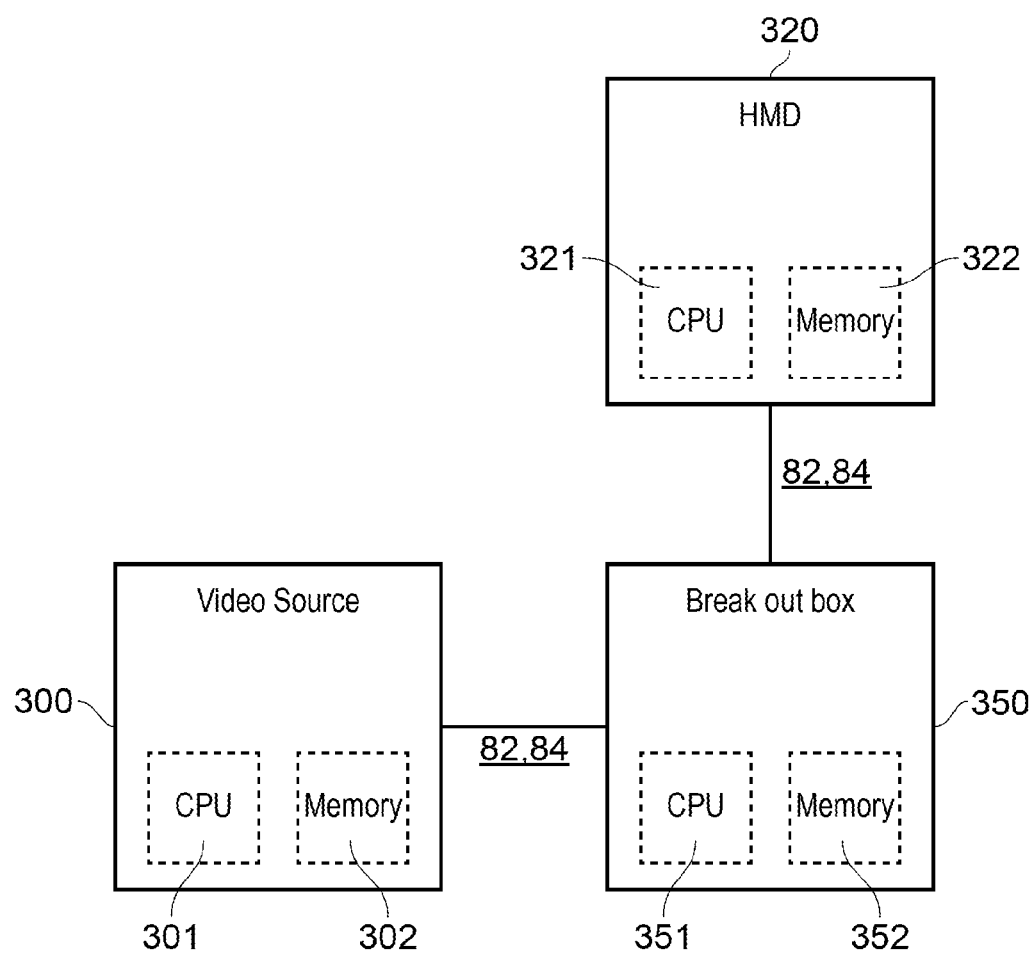
FIG. 39 is a schematic diagram of a hardware arrangement.

FIG. 39 schematically illustrates example hardware which may be used to implement the current techniques, and relates to apparatus features shown schematically in FIGS. 27 and 28. The HMD device 320 is connected to the break out box 350 by the cable(s) 82, 84, with each of the HMD and break out box containing a processing unit (321,351 respectively) and a memory unit (322, 352 respectively). The break out box is then further connected to a video source 350, for example a games console, via further cable(s) 82, 84. The video source also has its own processor 301 and memory unit 302. The processing of the image as described above may be carried out by any of the three processors (301,321, 351) in conjunction with their respective memory unit, or may be distributed amongst them. However, the present process lends itself to being carried out by the processor 321, that is to say the process is carried out at the HMD 320. In addition the hardware may be arranged without the break out box 350, such that the HMD 320 may be directly connected to the video source 300.

FIG. 39 therefore provides an example of an image processing apparatus operable to process an image generated for display by a head mountable display device according to an initial position and/or orientation of a viewpoint, the apparatus comprising:

a detector operable to detect a current position and/or orientation of the head mountable display device depending upon a display time at which the image is to be displayed; and a processor operable to process the image using pixel position mappings in which at least a subset of pixels of the distorted image are displaced by respective pixel displacements dependent upon the difference between the initial position and/or orientation and the detected position and/or orientation of the viewer's head at the time at which the image is to be displayed.

In summary, the present disclosure provides a convenient technique for manipulates the standard distorted games machine output, being easy to implement on low cost, simple hardware, which in turn lends itself to being implemented at the HMD.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

It will be apparent that numerous modifications and variations of the present disclosure are possible in light of the above teachings. It is therefore to be understood that within the scope of the appended claims, the technology may be practiced otherwise than as specifically described herein.

The invention claimed is:

1. An image processing method for a head mounted display device, operable in respect of an image generated for display by the head mountable display device according to one or both of an initial position or an initial orientation of a viewpoint, the method comprising:

detecting, by a sensor device, one or both of a current position or a current orientation of the head mountable display device depending upon a display time at which the image is to be displayed; and processing, by a processing device, the image using pixel position mappings in which at least a subset of pixels of the image are displaced by respective pixel displacements dependent upon a difference between at least one of the initial position and the detected current position or the initial orientation and the detected current orientation at the display time at which the image is to be displayed;

the processing step comprising applying a lateral pixel displacement to at least a subset of rows of pixels, the lateral pixel displacement depending on a difference in lateral rotation between the initial orientation and the detected current orientation of the head mountable display device;

wherein the lateral displacement is different for two or more subsets of rows of pixels, and the lateral displacement is greater for a subset of pixel rows towards a vertical centre of the image than for another subset of pixel rows towards a top or bottom of the image.

2. A method according to claim 1, in which the processing step comprises applying a vertical pixel displacement to the image in dependence upon a difference in vertical rotation between the initial orientation and the detected current orientation of the head mountable display device.

3. A method according to claim 1, in which the processing step comprises generating the pixel displacements as a function of pixel position in the image and the difference between the initial orientation and the detected current orientation of the head mountable display device.

4. A method according to claim 1, further comprising the step of distorting the generated image to compensate for optics of the display device.

5. A method according to claim 1, further comprising the steps of:
   detecting at least one of the initial position or the initial orientation of the head mountable display device; and
   generating the image according to at least one of the detected initial position or the detected initial orientation.

6. A non-transitory computer readable storage medium which stores computer readable instructions, the instructions, when executed by a processor, cause the processor to perform an image processing method for a head mounted display device, operable in respect of an image generated for display by the head mountable display device according to one or both of an initial position or an initial orientation of a viewpoint, the method comprising:
   detecting one or both of a current position or a current orientation of the head mountable display device depending upon a display time at which the image is to be displayed; and
   processing the image using pixel position mappings in which at least a subset of pixels of the image are displaced by respective pixel displacements dependent upon a difference between at least one of the initial position and the detected current position or the initial orientation and the detected current orientation at the display time at which the image is to be displayed;
   the processing comprising applying a lateral pixel displacement to at least a subset of rows of pixels, the lateral pixel displacement depending on a difference in lateral rotation between the initial orientation and the detected current orientation of the head mountable display device;
   wherein the lateral displacement is different for two or more subsets of rows of pixels, and the lateral displacement is greater for a subset of pixel rows towards a vertical centre of the image than for another subset of pixel rows towards a top or bottom of the image.

7. The non-transitory computer readable storage medium of claim 6, in which the processing further comprises applying a vertical pixel displacement to the image in dependence upon a difference in vertical rotation between the initial orientation and the detected current orientation of the head mountable display device.

8. The non-transitory computer readable storage medium of claim 6, in which the processing further comprises generating the pixel displacements as a function of pixel position in the image and the difference between the initial orientation and the detected current orientation of the head mountable display device.

9. The non-transitory computer readable storage medium of claim 6, in which the method further comprising the step of distorting the generated image to compensate for optics of the display device.

10. The non-transitory computer readable storage medium of claim 6, in which the method further comprises the steps of:
    detecting at least one of the initial position or the initial orientation of the head mountable display device; and
    generating the image according to at least one of the detected initial position or the detected initial orientation.

11. An image processing apparatus operable to process an image generated for display by a head mountable display device according to one or both of an initial position or an initial orientation of a viewpoint, the image processing apparatus comprising:
    a detector operable to detect one or both of a current position or a current orientation of the head mountable display device depending upon a display time at which the image is to be displayed; and
    a processor operable to process the image using pixel position mappings in which at least a subset of pixels of the image are displaced by respective pixel displacements dependent upon a difference between at least one of the initial position and the detected current position or the initial orientation and the detected current orientation at the display time at which the image is to be displayed;
    the processor being configured to apply a lateral pixel displacement to at least a subset of rows of pixels, the lateral pixel displacement depending on a difference in lateral rotation between the initial orientation and the detected current orientation of the head mountable display device;
    wherein the lateral displacement is different for two or more subsets of rows of pixels, and the lateral displacement is greater for a subset of pixel rows towards a vertical centre of the image than for another subset of pixel rows towards a top or bottom of the image.

12. A head mountable display device comprising apparatus according to claim 11.

13. The image processing apparatus of claim 11, in which the processor is further configured to apply a vertical pixel displacement to the image in dependence upon a difference in vertical rotation between the initial orientation and the detected current orientation of the head mountable display device.

14. The image processing apparatus of claim 11, in which the processor is configured to generate the pixel displacements as a function of pixel position in the image and the difference between the initial orientation and the detected current orientation of the head mountable display device.

15. The image processing apparatus of claim 11, in which the processor is further configured to distort the generated image to compensate for optics of the display device.

16. The image processing apparatus of claim 11, in which the processor is further configured to:
    detect at least one of the initial position or the initial orientation of the head mountable display device; and
    generate the image according to at least one of the detected initial position or the detected initial orientation.

* * * * *